(12) United States Patent
Srinivas et al.

(10) Patent No.: US 8,850,027 B2
(45) Date of Patent: *Sep. 30, 2014

(54) HARDWARE ACCELERATION FOR REMOTE DESKTOP PROTOCOL

(71) Applicant: Microsoft Corporation, Redmond, WA (US)

(72) Inventors: Nelamangal Krishnaswamy Srinivas, Sammamish, WA (US); Robert Wilhelm Schmieder, Snoqualmie, WA (US); Nadim Abdo, Bellevue, WA (US)

(73) Assignee: Microsoft Corporation, Redmond, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/065,289

(22) Filed: Oct. 28, 2013

(65) Prior Publication Data
US 2014/0055464 A1 Feb. 27, 2014

Related U.S. Application Data

(63) Continuation of application No. 12/324,305, filed on Nov. 26, 2008, now Pat. No. 8,572,251.

(51) Int. Cl.
| | |
|---|---|
| *G06F 15/173* | (2006.01) |
| *G06T 1/20* | (2006.01) |
| *H04L 29/08* | (2006.01) |
| *H04L 29/06* | (2006.01) |
| *G06F 9/44* | (2006.01) |
| *G06F 9/50* | (2006.01) |

(52) U.S. Cl.
CPC . *G06T 1/20* (2013.01); *H04L 67/04* (2013.01); *H04L 67/40* (2013.01); *G06F 9/4445* (2013.01); *G06F 9/5044* (2013.01)

USPC ........... 709/226; 709/203; 709/223; 709/217; 709/230; 345/503

(58) Field of Classification Search
USPC ......... 709/203, 217, 219, 223, 226, 230, 231; 345/503

See application file for complete search history.

(56) References Cited

U.S. PATENT DOCUMENTS

| | | | | |
|---|---|---|---|---|
| 6,275,867 B1 * | 8/2001 | Bendert et al. | ............... | 719/316 |
| 6,370,599 B1 * | 4/2002 | Anand et al. | ............... | 709/219 |

(Continued)

FOREIGN PATENT DOCUMENTS

| | | |
|---|---|---|
| JP | 64-010763 | 1/1989 |
| JP | 2001-177632 | 6/2001 |

(Continued)

OTHER PUBLICATIONS

"Windows 2003 Scalable Networking pack and its possible effects on Exchange," http://msexchangeteam.com/archive/2007/07/18/446400.aspx, 2008, 1-15.

(Continued)

*Primary Examiner* — Ramy M Osman
(74) *Attorney, Agent, or Firm* — Jim Sfekas; Kate Drakos; Micky Minhas

(57) ABSTRACT

A method for offloading remote terminal services processing tasks to a peripheral device that would otherwise be performed in a computer system's processor and memory. In one embodiment, the disclosed method is utilized in a layered network model, wherein computing tasks that are typically performed in network applications are instead offloaded to a peripheral such as a network interface card (NIC).

20 Claims, 16 Drawing Sheets

(56) References Cited

U.S. PATENT DOCUMENTS

| | | | |
|---|---|---|---|
| 6,427,171 | B1 | 7/2002 | Craft et al. |
| 6,788,704 | B1 | 9/2004 | Lindsay |
| 6,904,519 | B2* | 6/2005 | Anand et al. .................. 709/230 |
| 7,007,103 | B2 | 2/2006 | Pinkerton et al. |
| 7,203,741 | B2 | 4/2007 | Marco et al. |
| 7,254,637 | B2 | 8/2007 | Pinkerton et al. |
| 7,284,119 | B2 | 10/2007 | Hyder et al. |
| 7,437,547 | B2* | 10/2008 | Hyder et al. .................. 709/230 |
| 7,844,442 | B2 | 11/2010 | Tzruya |
| 7,899,864 | B2* | 3/2011 | Margulis ...................... 709/204 |
| 8,131,302 | B2* | 3/2012 | Quigley et al. ............... 455/450 |
| 8,572,251 | B2 | 10/2013 | Srinivas et al. |
| 2003/0158906 | A1* | 8/2003 | Hayes ........................... 709/211 |
| 2005/0122980 | A1* | 6/2005 | Anand et al. ............... 370/395.4 |
| 2005/0160251 | A1 | 7/2005 | Zur et al. |
| 2005/0281262 | A1 | 12/2005 | Zur et al. |
| 2006/0056435 | A1 | 3/2006 | Biran et al. |
| 2006/0253605 | A1 | 11/2006 | Sundarrajan et al. |
| 2007/0028025 | A1* | 2/2007 | Chen et al. .................... 710/315 |
| 2007/0097130 | A1* | 5/2007 | Margulis ...................... 345/501 |
| 2007/0098010 | A1* | 5/2007 | Dube et al. .................... 370/463 |
| 2007/0130352 | A1* | 6/2007 | Chhabra et al. ............... 709/230 |
| 2007/0244987 | A1 | 10/2007 | Pendersen et al. |
| 2008/0162958 | A1 | 7/2008 | Bozek et al. |
| 2008/0320142 | A1 | 12/2008 | Hicks et al. |
| 2009/0023452 | A1* | 1/2009 | Quigley et al. ............... 455/450 |
| 2009/0024687 | A1* | 1/2009 | Quigley et al. ............... 709/201 |
| 2009/0063665 | A1 | 3/2009 | Bagepalli et al. |
| 2009/0106436 | A1* | 4/2009 | Andersson et al. ........... 709/230 |
| 2010/0001995 | A1* | 1/2010 | Hamill et al. ................. 345/419 |
| 2010/0142813 | A1 | 6/2010 | Abdo |
| 2014/0055464 | A1* | 2/2014 | Srinivas et al. ............... 345/502 |

FOREIGN PATENT DOCUMENTS

| | | |
|---|---|---|
| JP | 2002-517855 | 6/2002 |
| JP | 2003-198673 | 7/2003 |
| JP | 2003-333076 | 11/2003 |
| JP | 2004-030612 | 1/2004 |
| JP | 2004-040698 | 2/2004 |
| JP | 2005-039540 | 2/2005 |
| JP | 2006-311582 | 11/2006 |
| JP | 2008-141487 | 6/2008 |
| JP | 2008-166980 | 7/2008 |
| WO | WO 2007/053304 | 5/2007 |

OTHER PUBLICATIONS

Soper, M.E., "Windows Vista SP1: What to Expect," http://www.informit.com/articles/article.aspx?p=1186881, 2008, 1-8.

Binkert, N.L., "Integrated System Architectures for High-Performance Internet Servers,"http://www.eees.umich.edu/~binkertn/pubs/binkert-thesis.pdf, 2006, 1-143.

Press Release, "Expand Networks' Acceleration Appliance is the only Virtualised Offering that Accelerates Microsoft Terminal Services RDP and Citrix/ICA," http://news.webindia123.com/news/press_showdetails.asp?id=9162&cat—Press, 2008, 1-3.

Gervais, J., "TCP Offload Engine speeds processing," http://www.networkworld.com/techinsider/2003/0707techupdate.html, 2003, 1-2.

"Intel 82575EB Gigabit Ethernet Controller Network Connectivity," http://download.intel.com/design/network/prodbrf/317554.pdf, downloaded 2008, 1-4.

International Patent Application No. PCT/US2009/062746: International Search Report and Written Opinion dated May 4, 2010, 12 pages.

Expand Networks, "Optimizing Citrix with Expand Networks", Mar. 2008, www.epand.com.

Dubie, Denise, "The next three big WAN optimizing targets", Sep. 29, 2007, PCWorld.

SilverPeak Systems, "WAN Acceleration Solutions", Nov. 2006, Silver Peak Executive Guide.

Virtualdub.org, "3D Graphics Acceleration Over Remote Desktop", Jun. 7, 2008.

Presentation and Hosted Desktop Virtualization Team, Remote Desktop Protocol Performance, MICROSOFT, Oct. 13, 2008, URL: http://download.microsoft.com/download/4/d/9/4d9ae285-3431-4335-a86e-969e7a146dlb/RDP_Performance_WhitePaper.docx.

* cited by examiner

HARDWARE ACCELERATION FOR REMOTE DESKTOP PROTOCOL

CROSS REFERENCE TO RELATED APPLICATIONS

This application is a continuation of U.S. patent application Ser. No. 12/324,305 filed Nov. 26, 2008, which is hereby incorporated by reference in its entirety.

This application is related by subject matter to the subject matter disclosed in the following commonly assigned patents, the entireties of which are hereby incorporated by reference herein: U.S. Pat. No. 7,007,103 entitled "Method To Offload A Network Stack" filed on Apr. 30, 2002; U.S. Pat. No. 7,254,637 entitled "Method To Offload A Network Stack" filed on Nov. 10, 2005; U.S. Pat. No. 7,284,119 entitled "Method And Computer Program Product For Offloading Processing Tasks From Software To Hardware" filed on Dec. 2, 2005; and U.S. Pat. No. 7,437,547 entitled "Method And Computer Program Product For Offloading Processing Tasks From Software To Hardware" filed on Sep. 26, 2007.

BACKGROUND

Network applications in computing systems can require significant host processor resources due to layered architectures such as the seven-layer ISO model or the layered model used by the Windows™ operating system. The functions that are performed on a data packet as it proceeds between layers can be software intensive and can demand a substantial amount of processor and memory resources. Furthermore, the capability, efficiency, and throughput of many computer hardware peripherals such as network interface cards (NICs) is also increasing. Such computer system peripherals are often equipped with a dedicated processor and memory and are typically capable of performing sophisticated and complex computing tasks that are otherwise performed by the computer system processor in software. For instance, many NICs are capable of independently performing tasks otherwise performed by the CPU in software at an appropriate network layer, such as checksum calculation/verification; data encryption/decryption; message digest calculation; TCP or UDP segmentation; receive side packet classification; packet filtering to guard against denial of service attacks; and others. As such, there is an advantage in offloading such CPU intensive tasks to a peripheral hardware device. This would reduce processor utilization and memory bandwidth usage in the host computer, and thereby increase the efficiency, speed and throughput of the overall system. Such offloading may be implemented using the techniques described in commonly assigned U.S. Pat. Nos. 7,254,637 and 7,437,547.

Remote computing systems can enable users to access resources hosted by the remote computing systems. Servers on the remote computing systems can execute programs and transmit signals indicative of a user interface to clients that can connect by sending signals over a network conforming to a communication protocol such as the TCP/IP protocol. Each connecting client may be provided a session, i.e., an execution environment that includes a set of resources. Each client can transmit signals indicative of user input to the server and the server can apply the user input to the appropriate session. The clients may use protocols such as the Remote Desktop Protocol (RDP) to connect to a server resource. Protocols such as RDP typically handle graphics, device traffic such as USB, printer keyboard and mouse and in addition, virtual channels for application between server and a client. The terminal server hosts client sessions which can be in hundreds in a typical server configuration.

Protocols such as RDP support various such remote client machine capabilities. Typically, graphics data from the server needs to be either encoded, encrypted in graphics primitive form or rendered on the server, and the resulting bitmap needs to be compressed/encrypted and transmitted over a network. Encoding, rendering and encryption operations are highly are computational in nature and require high CPU utilization. It would thus be advantageous to offload such CPU intensive tasks to a peripheral hardware device using the techniques described above.

SUMMARY

The present disclosure is directed to a system and method for offloading remote terminal access functions and tasks that were previously performed at processor-software level to an appropriate hardware peripheral coupled to the computer system. In one embodiment, tasks may be offloaded to network interface card (NIC) peripheral devices, which can perform some or all of the tasks otherwise performed by the computer CPU in software.

In an embodiment, the operating system (OS) may "query" the device drivers of a hardware peripheral (such as a NIC) that are connected to the computer system. The various device drivers may respond by identifying their respective hardware peripheral's processing capabilities, referred to herein as "task offload capabilities." In one embodiment, once the task offload capabilities of each particular peripheral have been identified, the OS can then enable selected peripherals to perform certain tasks. The OS can thereafter request that a peripheral perform the previously enabled task on a dynamic, as-needed basis.

In various embodiments, such tasks may comprise rendering and/or compression as and when such rendering and compression functions are needed during RDP protocol processing. Thus the hardware capabilities on the network card may be utilized by using the offload path for RDP level processing on top of other offloaded network offload tasks, such as TCP/IP, in-line with the protocol data flow.

In addition to the foregoing, other aspects are described in the claims, drawings, and text forming a part of the present disclosure. It can be appreciated by one of skill in the art that one or more various aspects of the disclosure may include but are not limited to circuitry and/or programming for effecting the herein-referenced aspects of the present disclosure; the circuitry and/or programming can be virtually any combination of hardware, software, and/or firmware configured to effect the herein-referenced aspects depending upon the design choices of the system designer.

The foregoing is a summary and thus contains, by necessity, simplifications, generalizations and omissions of detail. Those skilled in the art will appreciate that the summary is illustrative only and is not intended to be in any way limiting.

DETAILED DESCRIPTION OF ILLUSTRATIVE EMBODIMENTS

Computing Environments in General Terms

Figure 1:
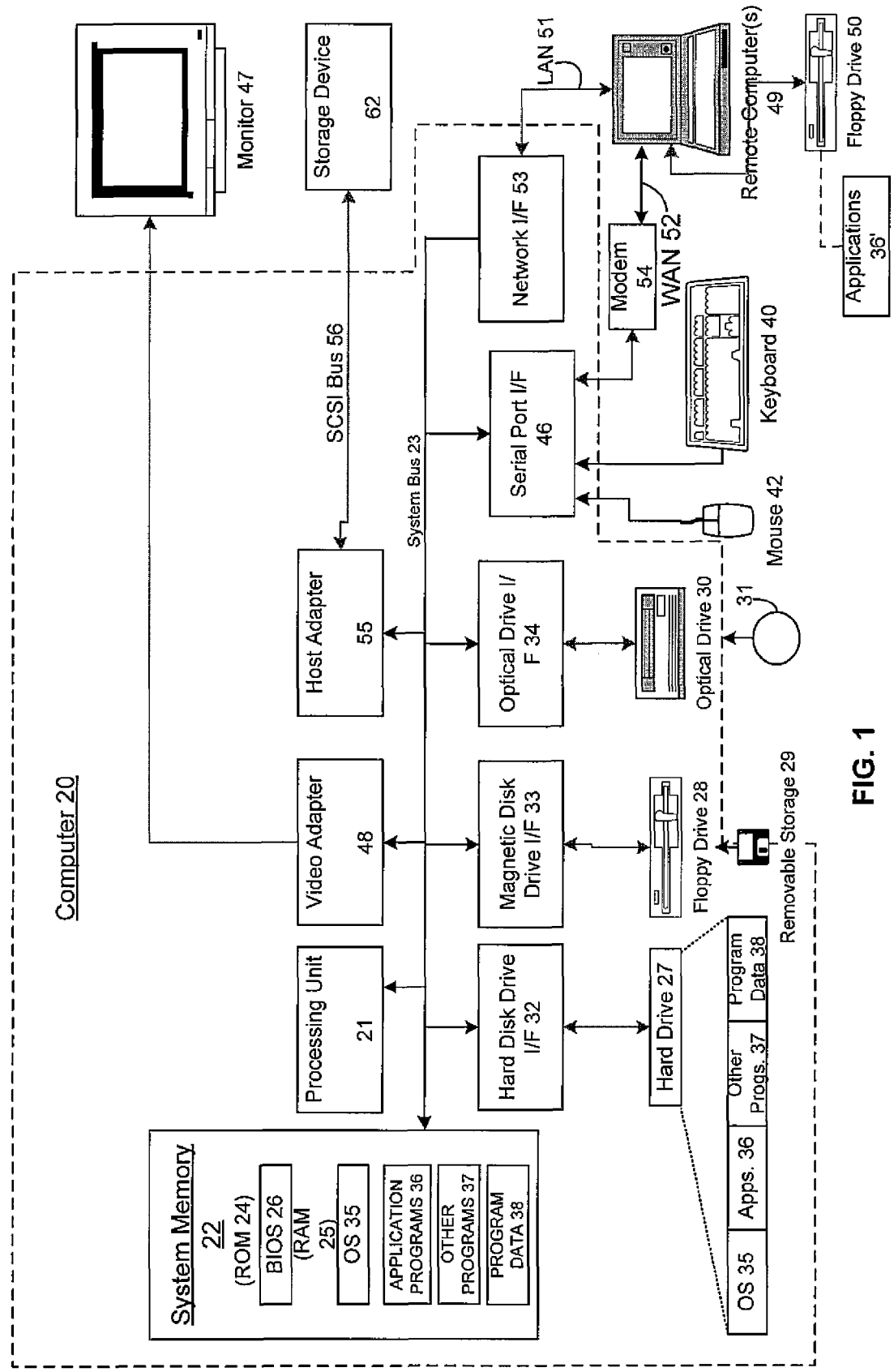
FIG. 1 depicts an example computer system wherein aspects of the present disclosure can be implemented.

Certain specific details are set forth in the following description and figures to provide a thorough understanding of various embodiments of the present disclosure. Certain well-known details often associated with computing and software technology are not set forth in the following disclosure to avoid unnecessarily obscuring the various embodiments of the presently disclosed subject matter. Further, those of ordinary skill in the relevant art will understand that they can practice other embodiments of the presently disclosed subject matter without one or more of the details described below. Finally, while various methods are described with reference to steps and sequences in the following disclosure, the description as such is for providing a clear implementation of embodiments of the presently disclosed subject matter, and the steps and sequences of steps should not be taken as required to practice this disclosure.

It should be understood that the various techniques described herein may be implemented in connection with hardware or software or, where appropriate, with a combination of both. Thus, the methods and apparatus of the disclosure, or certain aspects or portions thereof, may take the form of program code (i.e., instructions) embodied in tangible media, such as floppy diskettes, CD-ROMs, hard drives, or any other machine-readable storage medium wherein, when the program code is loaded into and executed by a machine, such as a computer, the machine becomes an apparatus for practicing the disclosed subject matter. In the case of program code execution on programmable computers, the computing device generally includes a processor, a storage medium readable by the processor (including volatile and non-volatile memory and/or storage elements), at least one input device, and at least one output device. One or more programs that may implement or utilize the processes described in connection with the presently disclosed subject matter, e.g., through the use of an application programming interface (API), reusable controls, or the like. Such programs are preferably implemented in a high level procedural or object oriented programming language to communicate with a computer system. However, the program(s) can be implemented in assembly or machine language, if desired. In any case, the language may be a compiled or interpreted language, and combined with hardware implementations.

A remote desktop system is a computer system that maintains applications that can be remotely executed by client computer systems. Input is entered at a client computer system and transferred over a network (e.g., using protocols based on the International Telecommunications Union (ITU) T.120 family of protocols such as Remote Desktop Protocol (RDP)) to an application on a terminal server. The application processes the input as if the input were entered at the terminal server. The application generates output in response to the received input and the output is transferred over the network to the client computer system. The client computer system presents the output data. Thus, input is received and output presented at the client computer system, while processing actually occurs at the terminal server. A session can include a shell and a user interface such as a desktop, the subsystems that track mouse movement within the desktop, the subsystems that translate a mouse click on an icon into commands that effectuate an instance of a program, etc. In another example embodiment the session can include an application. In this example while an application is rendered, a desktop environment may still be generated and hidden from the user. It should be understood that the foregoing discussion is exemplary and that the presently disclosed subject matter may be implemented in various client/server environments and not limited to a particular terminal services product.

In most, if not all remote desktop environments, input data (entered at a client computer system) typically includes mouse and keyboard data representing commands to an application and output data (generated by an application at the terminal server) typically includes video data for display on a video output device. Many remote desktop environments also include functionality that extend to transfer other types of data.

Communications channels can be used to extend the RDP protocol by allowing plug-ins to transfer data over an RDP connection. Many such extensions exist. Features such as printer redirection, clipboard redirection, port redirection, etc., use communications channel technology. Thus, in addition to input and output data, there may be many communications channels that need to transfer data. Accordingly, there may be occasional requests to transfer output data and one or more channel requests to transfer other data contending for available network bandwidth.

Figure 2:
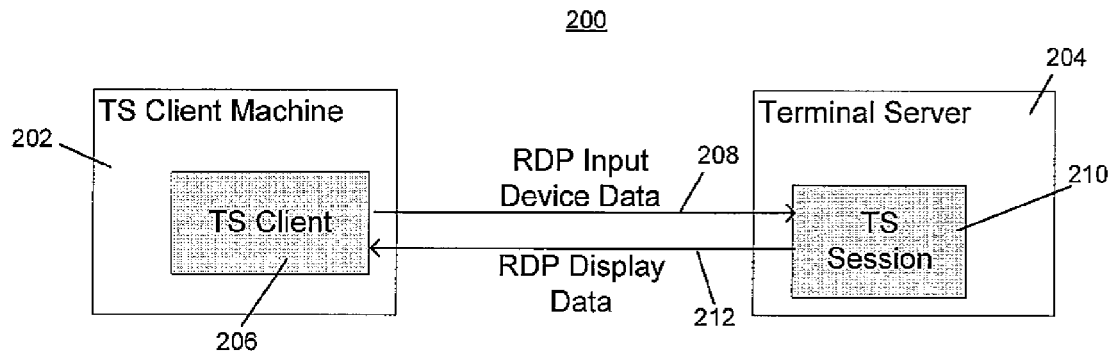
FIG. 2-4 depict an operational environment for practicing aspects of the present disclosure.

FIG. 2 shows an implementation 200 enabling terminal services. A TS client machine 202 and a TS 204 communicate using RDP. The TS client machine 202 runs a TS client process 206 that sends RDP input device data 208, such as for example keyboard data and mouse click data, to a TS session 210 that has been spawned on the TS and receives RDP display data 212, such as user interface graphics data. Generally, the TS client process 206 is a thin client process and most processing is provided on the TS 204.

Figure 3:
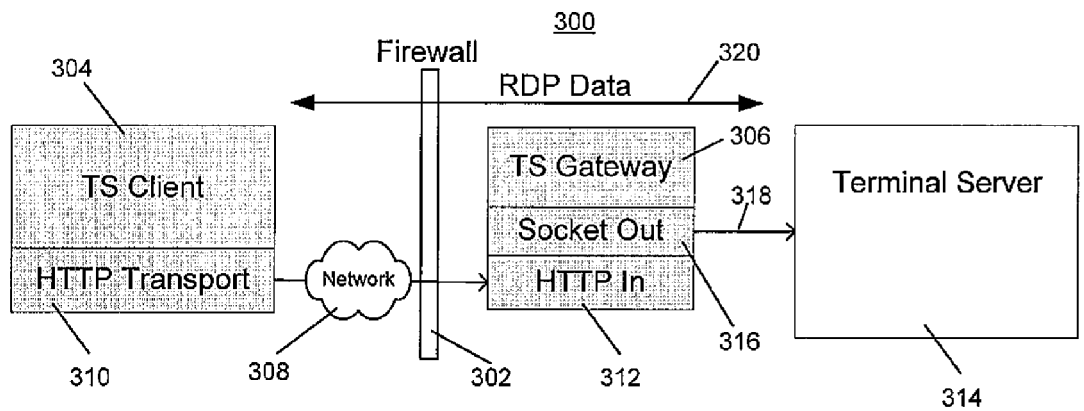

FIG. 3 shows an implementation 300 enabling terminal services through a firewall 302. A remote TS client 304 connects to a terminal services gateway (TSG) 306 over a network 308. A Hypertext Transfer Protocol (HTTP) transport process 310 on the TS client and an HTTP process 312 on the TSG 306 facilitate communication through the firewall 302. The HTTP transport process 310 wraps data, such as Remote Procedure Call (RPC) data or RDP data, in HTTPS headers for the TSG 306. The TSG 306 may connect to the TS 314 over a socket connection 318 via a socket out process 316. Once the TS client 304 is authenticated and a connection is established, RDP data 320 may be passed back and forth between the TS client 304 and the TS 314.

Figure 4:
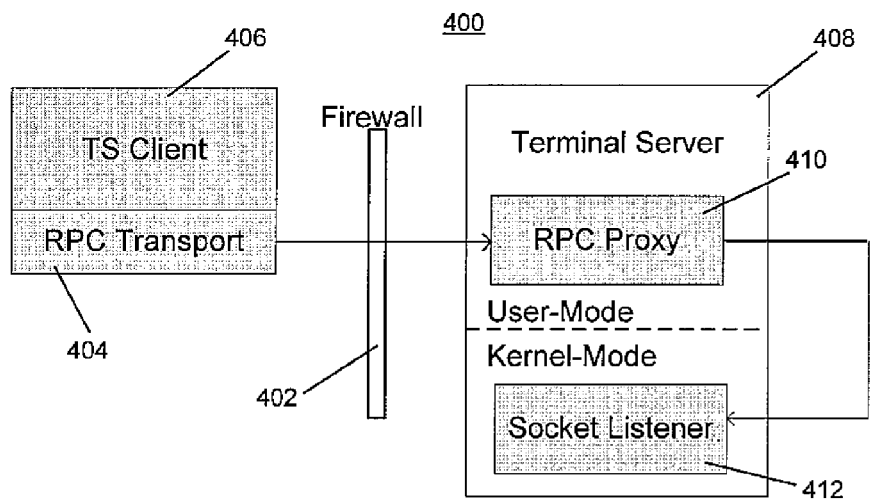

FIG. 4 shows a generalized example of an implementation 400, wherein an existing remote procedure call/hypertext transport protocol (RPC/HTTP) proxy is leveraged, thereby providing a terminal services protocol, such as RDP, over an RPC/HTTP connection through a firewall 402. The architecture of the implementation illustrates that by wrapping the RDP protocol within RPC calls, an existing RPC-based proxy can be advantageously utilized. In particular, an RPC Transport Plug-In 404 on the TS client 406 wraps an RDP stream providing communication between the TS client 406 and the terminal server 408 within an RPC protocol. This facilitates utilization of an RPC-based proxy, thereby enabling firewall navigation. The RPC-based proxy 410, which may run in a user-mode on the TS, can forward received data to a socket listener 412, which may run in kernel-mode on the TS.

As discussed above, clients may use a remote protocol such as Remote Desktop Protocol (RDP) to connect to a resource using terminal services. When a remote desktop client connects to a terminal server via a terminal server gateway, the gateway may open a socket connection with the terminal server and redirect client traffic on the RDP port or a port dedicated to remote access services. The gateway may also perform certain gateway specific exchanges with the client using a terminal server gateway protocol transmitted over HTTPS.

A virtual machine monitor, such as a hypervisor, is a program that creates virtual machines, each with virtualized hardware resources which may be backed by underlying physical hardware resources. FIG. 1a illustrates a virtual machine environment 100, with a plurality of virtual machines 120, 121, comprising a plurality of virtual processors 110, 112, 114, 116, and corresponding guest operating systems 130, 132. The virtual machines 120, 121 are maintained by a virtualizing layer 140 which may comprise of a scheduler 142 and other components (not shown), where the virtualizing layer 140 virtualizes hardware 150 for the plurality of virtual machines 120, 121. The plurality of virtual processors 110, 112, 114, 116 can be the virtual counterparts of underlying hardware physical processors 160, 162.

All of these variations for implementing the above mentioned partitions are just exemplary implementations, and nothing herein should be interpreted as limiting the disclosure to any particular virtualization aspect.

Hardware Acceleration Using Offloading

Embodiments of the present disclosure are generally directed to providing the ability to reducing the processing overhead and memory usage of a processing unit 21. This is accomplished by offloading particular computing tasks, which are accomplished for instance by way of an operating system, application programs and/or other program modules that are executing on the processing unit/CPU 21, to an appropriate peripheral hardware device connected to the computer system 20. Many such peripheral devices are increasingly equipped with dedicated processors and memory, and are fully capable of performing many of the same tasks that are typically accomplished solely by the CPU 21. Examples of such devices could include, for instance, network interface cards (53 in FIG. 1); disk drive interface cards (e.g., 32, 33, 34 in FIG. 1); small computer system interface (SCSI) devices; intelligent serial interface cards; or application specific peripherals, such as devices for the encryption/decryption of data.

While the general inventive concepts discussed herein could be used to offload computing tasks in connection with any of the above peripheral hardware devices, the disclosed subject matter will be described with respect to an example of one presently preferred embodiment, wherein computing tasks are offloaded to a network communications device, such as NIC 53 illustrated in FIG. 1. More particularly, illustrative embodiments are discussed as being implemented in the networking environment and architecture of the Windows operating system available from Microsoft Corporation. However, it will be appreciated that while specific reference is made to Windows concepts and terminology, those skilled in the art will recognize that many, if not most, operating systems and networking architectures share similarities relevant to the environment of the present disclosure.

Figure 5:
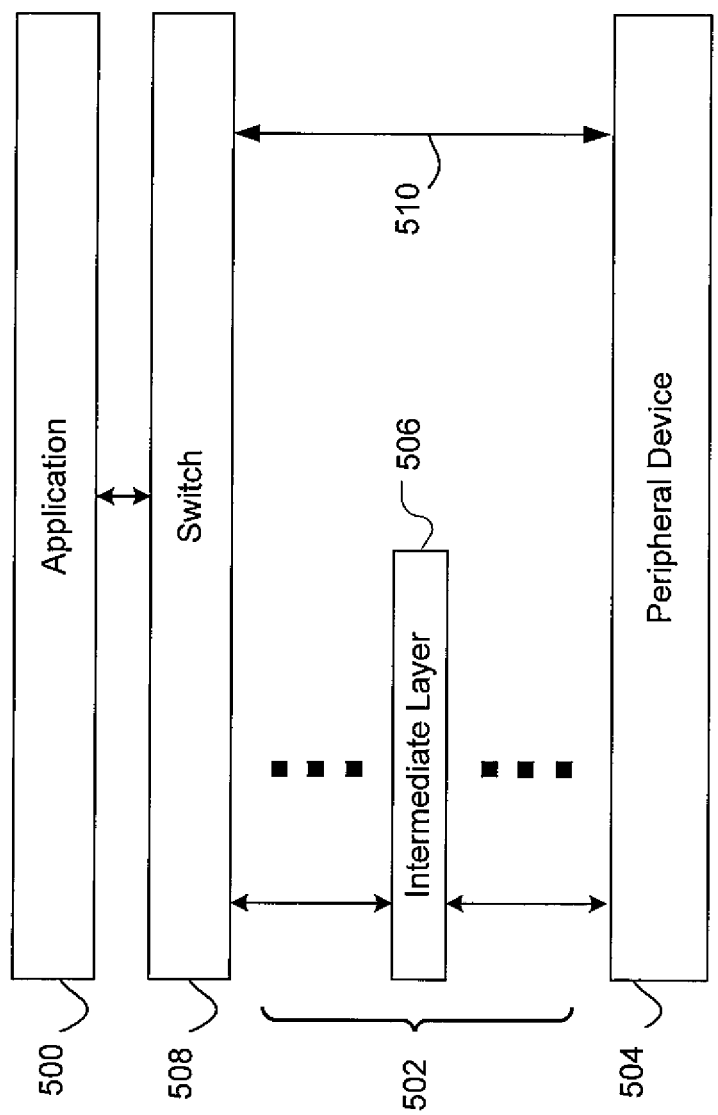
FIG. 5 illustrates functional layers of a network stack and a bypass path disclosed herein.

FIG. 5 illustrates the interrelationship of some of the components that make up a networking model and components of the present disclosure. During normal operation, networked messages are sent by the application 500 through network stack 502 to the peripheral device 504 where the messages are sent to other devices and applications on the network and received from the other devices and applications. The network stack 502 includes one or more intermediate software layers 506. Data sent from application 500 travels through the intermediate software layer(s) 506 where specific operations may be performed on the data such as packaging the data, reliable data transmission, data encryption and calculation of a message digest.

The switch 508 is used to offload the processing unit 150 from performing network stack operations for the intermediate software layer(s) 506. While the switch 508 is shown separately, it should be noted that the switch 508 may be integrated into the top intermediate layer of the network stack 502. Data is sent to the peripheral device 504 via chimney 510 for the peripheral device 504 to perform network stack operations. In this hierarchy, the intermediate software layers do not have to exclusively reside in the host or the peripheral device and it allows any of the intermediate layers to either be completely offloaded, to remain in the host, or a combination of both (e.g., offload one or more specific connections). Additionally, chimneys may be layered on top of chimneys (e.g., an IPSEC chimney may be layered on top of a TCP chimney). A connection may be any combination of reliable and unreliable data transfer and unicast or multicast data transfer. If an intermediate layer remains in the host, the host updates cached variables (as described below) in the peripheral device 504. For example, a transport control block (TCB) state entry for a connection can be offloaded for the transport layer with a route cache entry (RCE) for the network layer offloaded to the peripheral device 504. The switch 508 continues to send traffic for a different TCB through the network stack 502 that shares the same RCE while the switch 508 sends traffic through the chimney 510 for the offloaded TCB.

The switch 508 initiates the offload by sending the intermediate layer 506 an offload request. The offload request includes resource information that helps the peripheral device 504 decide whether it can successfully offload the connection. Each intermediate layer 506 either refuses the offload request or adds resource information to the offload request and sends the offload request to the adjacent software layer in the network stack 502. When the peripheral device 504 receives the offload request, it calculates whether it has resources available to offload the connection. The peripheral device 504 refuses the offload request if the offload is not possible. Otherwise, the peripheral device 504 accepts the offload request and allocates resources for the connection. The peripheral device 504 completes the offload request by sending a completion message having a linked list of parameters to the intermediate software layer(s) 506. The linked list of parameters provides information to the intermediate software layer(s) 506 and switch 508 to allow the intermediate software layer(s) 506 and switch 508 to communicate with the peripheral device. Each intermediate software layer 506 removes information for its layer from the linked list of parameters.

When an intermediate layer 506 receives the completion message for offloading, the intermediate layer 506 passes its state to the peripheral device 504. Each state may have three types of variables: CONST, CACHED, and DELEGATED. A state may have all three types of variables or a subset of the three types of variables. CONST variables are constants that never change during the life of the offloaded connection. They are not read back to the layers when the connection is uploaded. The host processing unit 21 maintains ownership of CACHED variables and ensures that any changes to a CACHED variable in the host processing unit 21 are updated in the peripheral device 504. Control messages that change the CACHED state are handled by the network stack 502. As a result, the host will write but does not need to read back the CACHED variables when the connection is uploaded. The host processing unit 21 transfers ownership of DELEGATED variables to the peripheral device 504. The DELEGATED variables are written once when the offload occurs and are read back when the offload is terminated. By only transferring back the DELEGATED variables, the overhead of transferring the connection back to the host is minimized. State that must be shared (e.g. controlled) between the network stack 502 and the peripheral device 504 that for various performance reasons is being offloaded (i.e., delegated) is cleanly divided between the network stack 502 and chimney 510 (e.g., IP ID in TCP offloads) such that both the network stack 502 and peripheral device 504 each owns an exclusive portion of the state. The host processing unit 21 queries the peripheral device 504 for DELEGATED variables when needed (e.g., for statistics). The host processing unit 21 may also query CONST or CACHED variables for diagnostics. Dividing the state into three categories enables the network stack 502 to coexist cleanly with the chimney 510. It should be noted that the state may be included in the offload request. This can be done if either the state does not contain delegated state variables or contains delegated state variables that will not change between the initial offload request and the completion of the offload request.

The peripheral device 504 or the host decides when an offloaded connection is to be uploaded. The upload is initiated by either the peripheral device 504 or the switch 508. Once the upload is initiated, the peripheral device 504 completes all outstanding requests with appropriate state and hands the delegated state of the topmost intermediate layer to the switch 508. The switch 508 queues any further transmit requests and stops posting receive buffers. The switch 508 commands the topmost intermediate layer to take control of the delegated state. The topmost intermediate layer takes control of the delegated state and sends a completion message to the switch 508. After the switch 508 receives the completion message, the switch 508 confirms the upload to the peripheral device 504, which enables the peripheral device 504 to free resources that are no longer being used.

It should be noted that the topmost intermediate layer forwards incoming data packets for the offloaded connection to the peripheral device 504 for processing until it takes control of the delegated state. Data packets may arrive between the time the peripheral device 504 hands the delegated state to the switch 508 and the time that the topmost intermediate layer takes control of the delegated state. After the peripheral device 504 hands the delegated state to the switch 508, it can no longer process incoming data packets. The peripheral device 504 sends an error message to the topmost intermediate layer indicating an upload is in progress when it receives incoming data. The error message informs the topmost intermediate layer to stop forwarding incoming data and to buffer further data until the topmost intermediate layer receives the delegated state. Alternatively, at the expense of additional buffer memory on the peripheral device 504, the incoming data could be forwarded to the peripheral device 504 for the peripheral device 504 to buffer the data.

Multiple connections may be off-loaded by an intermediate software layer 506 to the peripheral device 504. A reference counter is maintained by the intermediate software layer 506 of the number of upper layer state objects (i.e., state objects of layers above the intermediate software layer 506) which reference the intermediate software layer's state object for offload. A state object as used herein is a collection of state variables for a particular layer that are categorized as CONST, CACHED, or DELEGATED as used herein. If an intermediate layer's offloaded state object has no references to it by a layer above it, the intermediate layer 506 sends a message to the peripheral device 504 to upload the state object for the intermediate layer and send delegated state variables to the intermediate layer 506. The peripheral device 504 deletes the state object for the intermediate layer 506 and the intermediate layer 506 sends a completion message to the switch 508.

Figure 9:
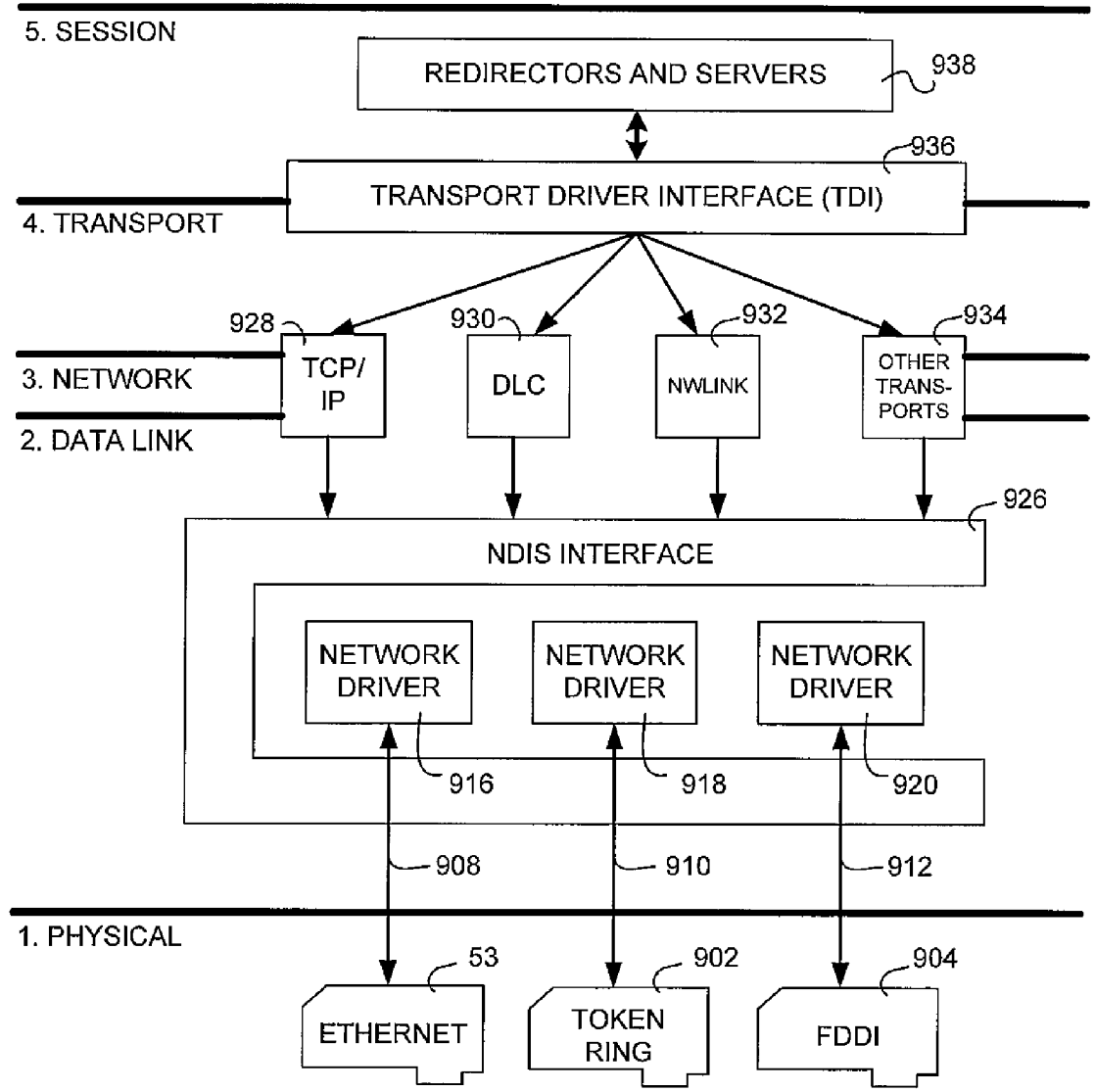
FIG. 9 illustrates some of the functional components present in a layered network architecture.

FIG. 9 illustrates a simplified diagram of certain of the components that make up a networking model in a Windows context. For purposes of illustration, the OSI layers that correspond to the various Windows components are also shown. At the bottom layer, corresponding to the physical layer in the OSI model, resides the actual NICs (sometimes referred to as network cards, or network adapters) 900-904. NICs are the hardware devices that provide the physical interconnection with the physical medium (the network cable), and the transmission of the signals that carry the data generated by all the higher level layers, in accordance with the particular network topology. As noted above, many NICs are equipped with a dedicated processor and memory, and are capable of performing additional sophisticated computing tasks—including tasks that may otherwise be handled by the host processor CPU. NICs can be physically implemented as a printed circuit board card that is positioned within a slot in the computer, as a PCMCIA type card that is placed within a PCMCIA-compliant slot, as a dedicated chip positioned within the computer chassis on the mother board, or in any other suitable matter.

Each NIC is logically interconnected with the Windows networking model, as is schematically represented by bidirectional lines 908-912, via a corresponding network driver 916-920. Network drivers reside in the MAC sublayer of the network model, and link Windows to the physical network channel via the corresponding NICs. Each driver, typically implemented as a software component provided by the vendor of the corresponding NIC, is responsible for sending and receiving packets over its corresponding network connection and for managing the NIC on behalf of the operating system. Each driver also starts I/O on the corresponding NIC and receives interrupts from them, and calls upward to protocol drivers to notify them of its completion of an outbound data transfer. Also, the device driver will be responsible for invoking, controlling and/or monitoring any of the additional processing capabilities of the corresponding NIC.

In some environments the driver component is written so as to implement a single specific network protocol, such as TCP/IP or XNS. The presently disclosed subject matter would be applicable to such an environment. For purposes of illustration however, the present disclosure is described in connection with the Windows network architecture, in which an interface and environment called the network driver interface specification (NDIS) is provided. The NDIS interface is functionally illustrated in FIG. 9 at 926. NDIS shields each of the network drivers 916-920 from the details of various transport protocols (examples of which are shown at 928-934), and vice versa. More particularly, NDIS describes the interface by which one or multiple NIC drivers (916-920) communicate with one or multiple underlying NICs (900-904), one or multiple overlying transport protocol drivers, or transports, (represented at 928-934 in FIG. 9), and the operating system.

Essentially, NDIS defines a fully abstracted environment for NIC driver development. Thus, for every external function that a NIC driver needs to perform, from registering and intercepting NIC hardware interrupts to communicating with transport protocol drivers to communicating with an underlying NIC via register manipulation and port I/O, it can rely on NDIS APIs to perform the function. To provide this level of abstraction and resulting portability, NDIS uses an export library referred to as the NDIS Interface Library Wrapper (not shown). All interactions between NIC driver and protocol driver, NIC driver and operating system, and NIC driver and NIC are executed via calls to wrapper functions. Thus, instead of writing a transport-specific driver for Windows NT, network vendors provide the NDIS interface as the uppermost layer of a single network driver. Doing so allows any protocol driver to direct its network requests to the network card by calling this interface. Thus, a user can communicate over a TCP/IP network and a DLC (or an NWLINK, or DECnet, VINES, NetBEUI and so forth) network using one network card and a single network driver.

At the network and data link layers are transport, protocol and related drivers, shown by way of example in FIG. 9 at 928-934. In Windows, a transport protocol driver is a software component that implements a transport driver interface (TDI), or possibly another application-specific interface at its upper edge, to provide services to users of the network. In Windows, the TDI provides a common interface for networking components that communicate at the Session Layer, such as the Redirector and Server functions illustrated at functional block 938. As is well known, transport protocols act as data organizers for the network, essentially defining how data should be presented to the next receiving layer and packaging the data accordingly. They allocate packets (sometimes referred to in the Windows context as NDIS packets), copy data from the sending application into the packet, and send the packets to the lower level device driver by calling NDIS, so that the data can be sent out onto the network via the corresponding NIC.

It will be appreciated that additional functions, or tasks, can also be performed on the data packet as it passes through the various network layers, typically at layers 3 and 4 of the network model. In accordance with the present disclosure, such additional functions or task may be performed instead by the NIC hardware.

For instance, one task conventional performed by transport protocol drivers may be to calculate a checksum value and then append it to the packet. This helps to assure the integrity of the data as it traverses network links. Generally, this operation requires the transport protocol corresponding with the sender of the network packet to append it with a number calculated by adding up the data elements composing the packet. The receiver of the packet then compares the appended checksum number to the data, thereby confirming that data was not changed in transit. This checksum calculation and comparison may instead be offloaded to the NIC hardware.

Another related task that could optimally be performed in the NIC hardware is the calculation of a message digest for the data packet. Like the checksum, a message digest is used to guarantee the integrity of the data in the packet. In addition, a message digest can be used to guarantee the authenticity of the data by assuring that the party who sent the message is who they purport to be. Calculation of a message digest is very CPU intensive, and is a function that is expensive to implement in software.

Another desirable function is the encryption of the data within the packet. Encryption refers to the cryptographic process of transforming the message in the packet so that it becomes impossible for an unauthorized reader of the packet to actually see the contents of the message without prior knowledge of the encryption key. Of course, cryptographic algorithms also tend to be very CPU and memory intensive, and can be prohibitively expensive if performed in software. Examples of such encryption include Secure Socket Layer protocol (SSL) encryption and Internet security protocol encryption or "IPSec." As is well known, SSL and IPSec encryption protocols are both very CPU and memory intensive.

Another task that can be performed on the data packet is TCP or UDP segmentation. As is well known, TCP and UDP protocols segment large data packets into segments that align with the maximum data size allowed by the underlying network. For instance, Ethernet allows a maximum of 1514 byte packets on the network. Thus, if TCP or UDP must send 64 Kbytes for example, it must parse the data into 1514 byte segments.

In addition, packet classification is often performed on data packets as they are received from a network. Packet classification includes the identification of data packet for Quality of Service (QoS). In other words, each data packet contains fields which define modes of service that should be performed on the data packet in order to ensure optimal performance. For example, data packets that include video and audio may require certain functions to be performed thereon in order to ensure high fidelity in the presentation of video and audio. The classification of the data packets in order to identify the mode of service may be offloaded to the NIC hardware in accordance with the present disclosure.

Packet filtering may also be performed by the NIC hardware instead of by the CPU. In particular, data packets may be evaluated to determine whether they are characteristic of being part of a denial of service attack. Often, server software is created under the assumption that clients that request service are not malicious. However, a client having sufficiently educated, but malicious, user may often issue requests to the server that are designed to prevent the server from servicing other users. Denial of service attack filtering refers to the ability to evaluate data packets to determine if they are characteristic of a denial of service attack.

One example of a denial of service attack is a "SYN flood attack," in which, for one reason or another, the client does not send any final acknowledgment to the server's SYNchronize-ACKnowledge (SYN-ACK) response in the handshaking sequence. This causes the server to continue signaling until the server eventually times out.

Another type of denial of service attack is called a fragmentation or "teardrop" attack. Internet Protocol requires a packet be fragmented if the packet is too large for handling in the next router. The later fragmented packet identifies an offset to the beginning of the first packet that enables the entire packet to be reassembled at the receive side. In the fragmentation attack, the user puts a counterfeit offset value in the later fragment, often causing the receive side to become dysfunctional. The NIC hardware may be configured to handle filtering for these types of denial of service attacks by evaluating data packets to determine if they are characteristic of a particular kind of denial of service attack.

These and other functions are typically performed by the computer CPU 20 in software components residing at the various network layers, and thus can utilize substantial computer resources, resulting in an overall decrease in the computer system performance. Thus, offloading these, or other similar tasks, so that they can instead be performed at the corresponding NIC hardware can greatly increases the overall speed and efficiency of the computer system.

Figure 6:
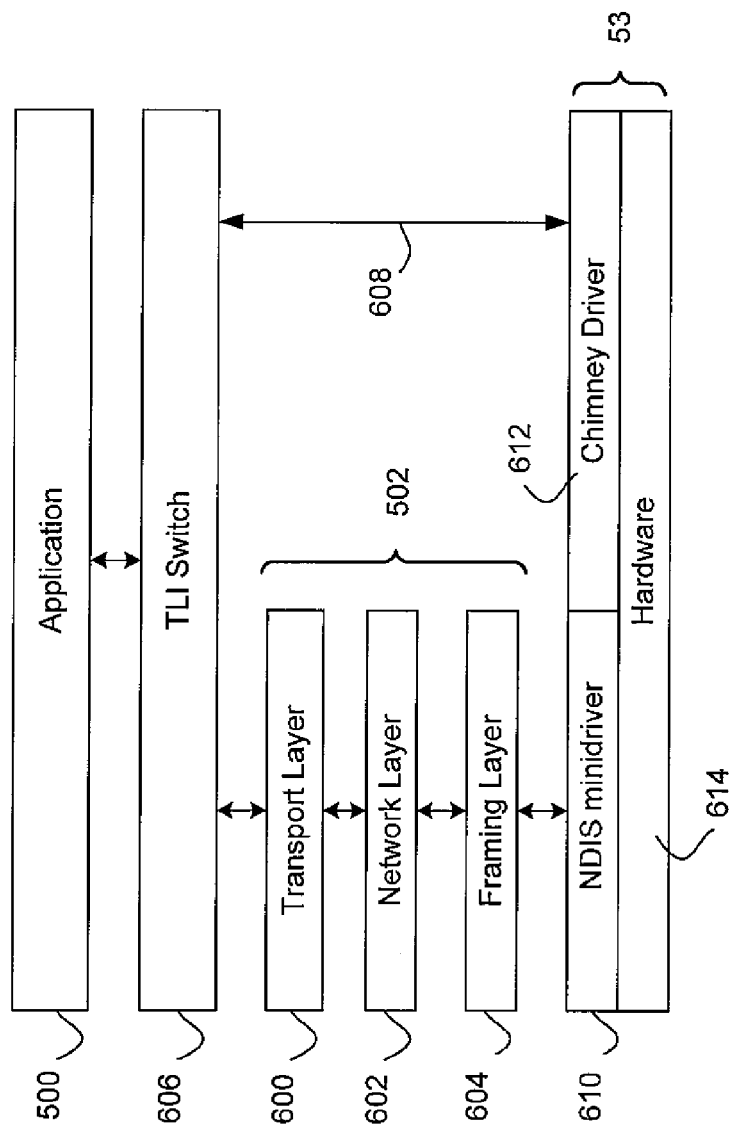
FIG. 6 illustrates functional layers of the NDIS path and a bypass path disclosed herein.

Turning now to FIG. 6, illustrated is one embodiment where the peripheral device 504 is NIC 56, the switch 508 is a transport layer interface switch (TLI) 606, and the network stack 502 comprises a transport layer 600, a network layer 602, and a framing layer 604. Network layer 602 is also known as a path layer and the framing layer 604 is also known as a neighbor layer.

Networked messages are sent by the application 500 through network stack 502 to the NIC 56 during operation. Data sent from the application 500 travels through the TLI switch 606, which controls whether the data goes down the host based network stack 502 or the chimney 608. Note that the TLI switch 606 may be incorporated into the top layer of the network stack 502. The software layers in the network stack 502 receive data from the application 500, package it in a packet form and sends it to the peripheral device hardware 614 via NDIS minidriver 610. Other tasks the network stack 502 may perform as a data packet passes through the stack 502 includes data encryption, reliable data transmission, and calculation of a message digest (e.g., checksum or CRC for the data packet). Many of these tasks are performed by the processing unit 21 and are processor intensive.

The TLI switch 606 is used to offload the processing unit 21 from performing stack operations by sending data for connections to the NIC 56 via chimney 608 (and chimney driver 612). Those skilled in the art will recognize that the upper edge of NDIS minidriver 610 and chimney driver 612 is the NDIS API in Microsoft® operating systems. For purposes of explanation, a transmission control protocol (TCP) based protocol stack will be used to explain the disclosed subject matter. However, it will be appreciated that those skilled in the art will recognize that many types of peripheral devices may be used and other network stacks may be offloaded using the teachings of the present disclosure. For example, stream control transmission protocol (SCTP) or user datagram protocol (UDP) based protocol stacks may be offloaded. Additionally, the present disclosure may also be used to offload higher function protocols such as the internet small computer system interface (iSCSI), the network file system (NFS), or the common interface file system (CIFS).

There are many reasons why an offload occurs. By way of example, and not limitation, some of the reasons are provided below. A system administrator could select a specific service to be offloaded. A specific connection may be offloaded if traffic (in terms of number of bytes or packets) on the connection is consuming a significant amount of resources. Types of services may be offloaded. For example, security protocols such as IPSEC may be offloaded. Offloads may be driven by policy. For example, an administrator may have a policy that all connections from within an organization are offloaded first. System resources (e.g., cpu utilization, data cache use, page table cache use, memory bandwidth) being used may lead the host processor to offload connections.

Figure 7:
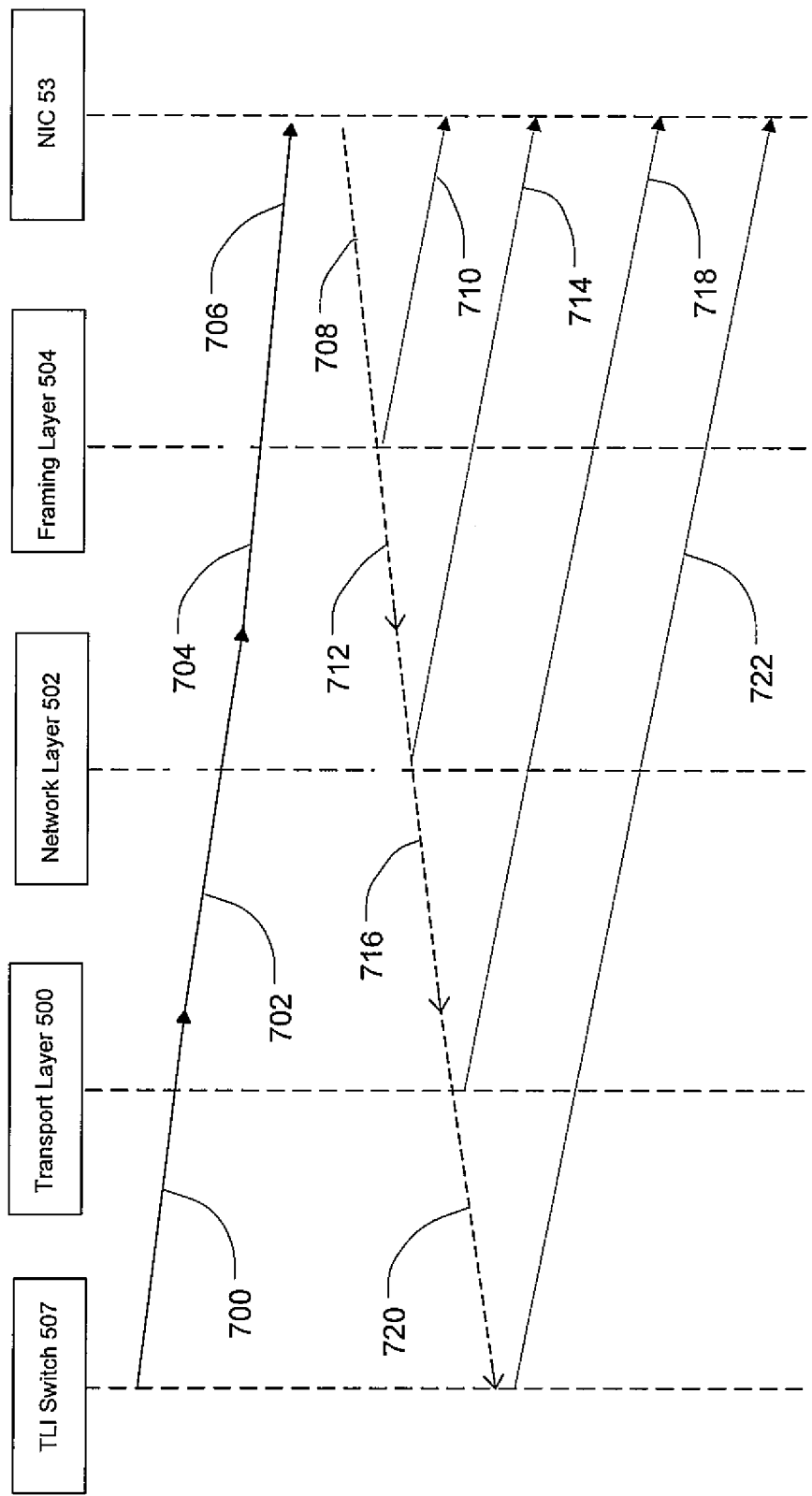
FIG. 7 illustrates a ladder diagram illustrating an offload mechanism disclosed herein.

FIG. 7 illustrates the steps taken to offload a TCP connection. A three stage process is used. In general, the three stage process is to allocate resources required to offload the TCP connection, provide handles to each of the layers 500, 502, 504, 506 and offloads the state for each of the layers 500, 502, 504, 506 to the NIC 53. During the offload transition, the TLI switch 506 buffers all messages sent from the application 200. Alternatively, the transport layer 500 buffers the data. When the offload is complete, the buffered data is transferred to the NIC 53 using the same mechanism as offload data transmission. When incoming packets are received during the offload transition, the NIC 53 continues to move the data up through the layers 500, 502, 504, 506 until the transport layer delegated state is handed to the NIC 53.

The TLI switch 506 initiates the offload by sending the transport layer 500 an offload request (line 700). The offload request includes a pointer to the next layer's local state (e.g., a TCB pointer for transport layer 500, an RCE pointer for network layer 502, an ARP table pointer for the framing layer 504 or a NDIS miniport pointer for the NDIS minidriver 510), the offload type (e.g., TCP for TLI switch 506, IPv6 for network layer 502, etc.), and resource information that helps the NIC 53 decide whether it can successfully offload the TCP connection. The TLI switch 506 may also provide dispatch tables to the NIC 53. The transport layer 500 either refuses the offload request or sends an offload request to network layer 502 with TCP resource information added to the TLI switch resource information (line 702).

The network layer 502 receives the offload request and either refuses to offload the connection or sends an offload request to the framing layer 504 with network resource requirements added to the TCP resource information and the TLI switch resource information (line 704). The network layer 502 may also provide dispatch tables to the NIC 53. The framing layer 504 either refuses to offload the connection or sends an offload request to the NIC 53 with framing resource requirements added to the network resource requirements, the TCP resource information and the TLI switch resource information (line 506).

The NIC 53 receives the offload request and calculates whether it has resources available to offload the TCP connection. If the NIC decides the offload is not possible, it refuses the offload request. If the NIC decides the offload is possible, it accepts the offload request and allocates resources (e.g., TCB, route cache entry (RCE), address resolution protocol (ARP) table entry (ATE)) for the connection. The NIC 53 creates a linked list of parameters and dispatch tables to hand to the layers 500, 502, 504 and 506 and completes the offload request by sending a completion message having the linked list of parameters to the framing layer 504 (line 408). The parameters include an offload handle and dispatch table for each of the layers 500, 502, 504, 506. As used herein, an offload handle means a mechanism to allow a software layer to communicate with the peripheral device. By way of example and not limitation, the offload handle may be a pointer-based handle, an integer value used as a lookup into an array, a hash table (e.g., a hashing function), a communication channel between the software layer (or network stack) and the peripheral device, or a set of parameters passed down by a software layer that the peripheral device uses to look up the state object.

The dispatch tables are used to send data directly to the NIC 53 or receive data directly from the NIC 53. The dispatch tables can also be used to provide diagnostics. For example, a software layer could be added to monitor the system and inject faults to make sure the system is functioning properly. Additionally, the dispatch table can be patched by software layers that can add additional functionality if needed. For example, a software layer could be added to provide the functionality of a filter driver. Patching is typically done by grabbing the pointer to the original function where the added function is being inserted and redirecting it (i.e., pointing it) to the added function. After the patch has been inserted, the added function performs its function and then calls the original function whenever the original function is called.

The framing layer 504 stores the offload handle and dispatch table for the framing layer in its ARP Table Entry for easy updates if the destination MAC address changes or the encapsulation type changes. The framing layer 504 then updates the NIC 53 state associated with the ATE (line 710). The framing layer 504 removes its state from the linked list and forwards the remaining information in the linked list to the network layer 502 (line 712).

The network layer 502 stores the offload handle and dispatch table for the network layer 502. The network layer 502 also sends it state to the NIC 53 (line 714). The network layer 502 removes network layer information from the linked list and sends a completion message having the linked list of parameters and dispatch tables to the transport layer 500 (line 716). The network layer 502 may forward IP fragments it receives for the offloaded state to the NIC 53 for processing or it may process the IP fragments in the network layer and forward them to the transport layer 500.

In an alternate embodiment, the layer's state object is sent with the offload request. For example, the framing layer state object and network layer state object is sent with the offload request and only if the cached state changes between the offload request and the completion event is the state updated. The entire layer state object can only be sent with the offload request if the delegated state is either not present or cannot change between the offload request and the completion of the offload request. However, state variables classified as CONST may be sent with the offload request even if the delegated state is present and may change between the offload request and the completion of the offload request.

The transport layer 500 stores the offload handle for the transport layer and sends its state to the NIC 53 (line 718). If there are any outstanding send or receive buffers pending, the transport layer 500 returns the buffers to the TLI switch 506. Once the transport layer 500 starts handing the buffers back to the TLI switch 506, the TLI switch 506 will stop sending buffers to the transport layer 500 and queues them and waits for the transport layer 500 to send a completion message having the linked list of parameters and the dispatch table to the TLI switch 204. The transport layer 500 returns all buffers and then sends the completion message (line 720). Once the TLI switch 506 receives the completion message, the TLI switch 506 transfers the send and receive buffers to the NIC 53 (line 722). The TLI switch 506 uses the dispatch table to post all outstanding and future receive buffers and sends to the NIC 53 for processing. During the time the offload request takes to complete, each layer 500, 502, 504 either refuses new offload requests for the offloaded state object (i.e., the state object associated with a layer) or queues them until the offload is complete.

The transport layer 500 still has the ability to process incoming TCB data and hand the data to the TLI switch 506 if the transport state hasn't been offloaded to the NIC 53. If TCB data arrives in the middle of an offload, the transport layer 500 may either hold on to the data or process the data and hand it to the TLI switch 506. Between the time that the transport layer 500 sends its state to the NIC 53 (line 718) and the time the TLI switch transfers buffers to the NIC 53 (line 722), incoming TCB data coming up through the network stack 202 is sent to the NIC 53.

On subsequent offload requests, the network layer 502 and the framing layer 504 pass the offload handles they received from the NIC 53 from the prior offload to the NIC 53. This signals the NIC 53 that resources for the network layer 502 and framing layer 504 have already been allocated, which conserves NIC resources and speeds up the offload.

As previously indicated, the layers 500, 502, 504 pass their state to the NIC 53. Each state has three types of variables: CONST, CACHED, and DELEGATED. CONST variables are constants that never change during the life of the offloaded connection. They are not read back to the layers when the connection is terminated. The host processing unit 21 maintains ownership of CACHED variables and ensures that any changes to a CACHED variable in the host processing unit 21 are updated in the NIC 53. As a result, the host will write but never read back the CACHED variables (unless system diagnostics requests it). The host processing unit 21 transfers ownership of DELEGATED variables to the NIC 53. The DELEGATED variables are written once when the offload occurs and are read back when the offload is terminated. By only transferring back the DELEGATED variables, the overhead of transferring the connection back to the host is minimized. The host processing unit 21 queries the NIC 53 for DELEGATED variables when needed (e.g., for statistics)

The CONST variables for the transport layer 500 include the destination port, the source port, a flag to indicate there is a Mobile IP case where the 'care-of' address can change, SEND and RECV window scale factors, and the NIC handle for the network layer 502. The CACHED variables for the transport layer 500 are TCP variables and IP variables. The TCP variables include the Effective MSS, the number of bytes to be copied in the receive indicate by the NIC 53, a flag to turn off Nagling, a flag to indicate that Keep-Alive is needed, and Keep-Alive settings (i.e., interval, number of probes, and delta). The IP variables include TOS and TTL. The DELEGATED variables include current TCP state, sequence number for next RECV (i.e., RCV.NEXT), receive window size (RCV.WND), the sequence number for First Un-Acked Data (SND.UNA), the sequence number for next SEND (SND.NEXT), the maximum sequence number ever sent (SND.MAX), the maximum Send Window (MAX_WIN), the current congestion window (CWIN), the slow start threshold (SSTHRESH), the smoothed RTT (8*A), Delta (8*D), the current retransmit count, the time remaining for Next Retransmit, and the time stamp to be echoed.

The CONST variables for the network layer 502 include the destination IP address (for either IPv4 or IPv6) and the source destination IP address (for either IPv4 or IPv6). The CACHED variables for the network layer 502 include the NIC handle for the framing layer 504. The DELEGATED variables for the network layer 502 include the IP Packet ID start value. The CACHED variables for the framing layer 504 include the ARP address and a flag to indicate the format of the header (e.g., LLC/SNAP [Logical Link Control/Sub-Network Access Protocol] or DIX [Digital, Intel, Xerox]).

The transport layer state includes a handle for the network layer and the network layer state includes a handle for the framing state because the network layer state can be shared between multiple connections and the framing layer state can be shared between multiple paths (e.g., IP aliases). This hierarchy is maintained for several reasons. A connection requires a NIC handle for the network layer because the IP ID namespace must be managed across all offloaded connections on a per path basis. A path requires a NIC handle for the framing layer because a route update could change the next hop address, thus pointing to a new MAC address. The hierarchy also condenses the amount of state required to be maintained by the NIC. For example, an ARP update for IPv4 could change the mapping from an IP address to a MAC address (e.g., an interface failed over on the server). The host maintains the MAC address as a cached variable, thus it only needs to do a single update of the cached state and all connections are failed over to the new interface.

Once a TCP connection is offloaded, the NIC 53 is responsible for assigning packet identifiers (e.g., IP IDs) for the packets it sends. IP ID is offloaded on either a per interface basis or a per layer state object basis. The NIC 53 is assigned a portion of the IP ID namespace. In one embodiment, the NIC 53 is assigned half of the total IP ID namespace and is given an IP packet ID start value to use when the network state is passed to the NIC 53. The NIC 53 uses the following formula to generate an IP ID on IP packets it sends: Cur.sub.--IPID=[(Start.sub.--IPID_For_This_Path)+(Counter_For_This_Path)mo-d32k] mod 64K Counter_For_This_Path=Counter_For_This_Path+1

When the offloaded connection is either uploaded or invalidated, the NIC 53 transfers the next IPID value it would use to the network layer to store for the next offload that occurs and the host processing unit 21 continues to use the portion of the IP ID namespace it was assigned. The host processing unit 21 could use the full IP ID name space, but the counter would have to be set each time an offload occurs.

The NIC 53 places data into receive buffers in the order the data is received and fills application buffers in the order they are posted for the offloaded connection. Many applications wait for a receive indication before posting a receive buffer. In one embodiment, the NIC 53 has a global pool of buffers to use if data arrives for a connection and no application receive buffers have been posted. The global pool of buffers is used across the offloaded connections and may be used to implement: 1) handling of out-of-order TCP transmissions; 2) defragmenting IP datagrams; 3) a buffer copy algorithm rather than a zero copy algorithm if the application is posting buffers that are too small for a zero copy algorithm. Alternatively, a per-connection pool of buffers may be used if efficient use of resources is not a concern. However, the global pool of buffers is used if a NIC does not support a per connection pool of buffers or for lack of system resources (e.g., not enough resources to pin the application buffer in memory).

Figure 8:
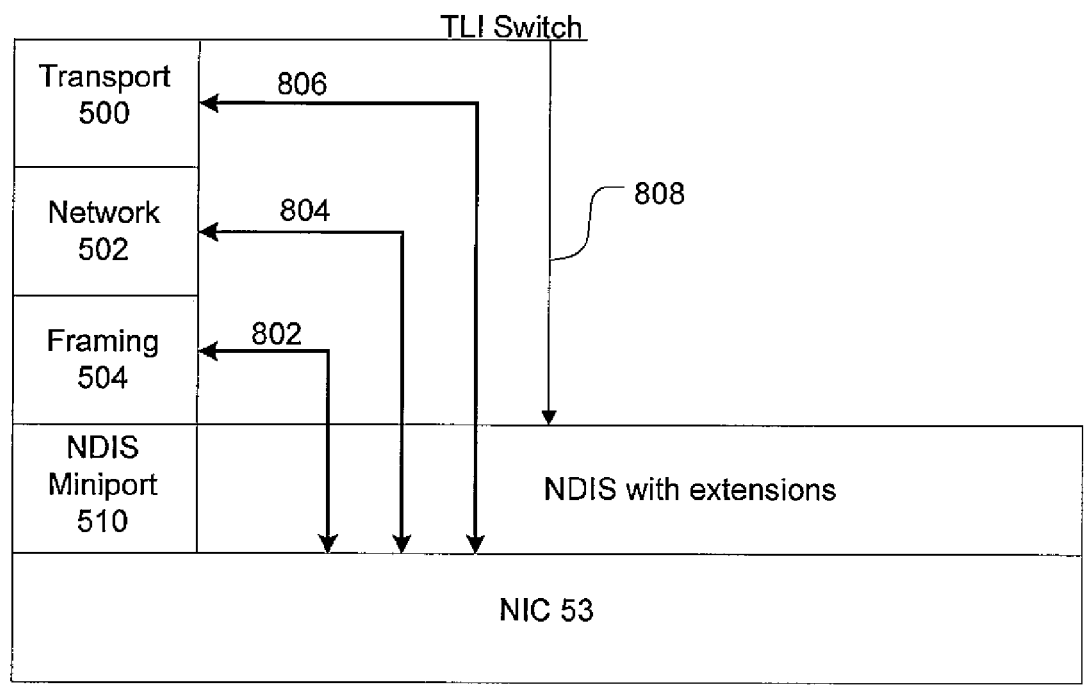
FIG. 8 is a block diagram illustrating the synchronization between a host computer and a peripheral device.

Turning now to FIG. 8, once a connection has been offloaded to the NIC 53, there are two paths to the NIC 53. The first path is through the NDIS minidriver 510 through the framing layer 504, the network layer 502, and the transport layer 500. The second path is through the offloaded connection 808, which is called a chimney. From the host computer's perspective, everything is the same for the two paths in terms of communication. The cached state variables synchronize the two paths with the processing unit 21 updating the cached state variables in the NIC 53 as previously indicated. The updating of cached variables is indicated by arrows 802, 804, 806.

When an incoming data packet arrives, the NIC 53 determines whether the incoming data packet goes through the offloaded path or the non-offloaded path (i.e., through the NDIS path of NDIS minidriver 510 and the layers 504, 502, 500). In one embodiment, the NIC 53 determines which path to send the incoming data packet by performing a hashing function on the source and destination TCP port number, source and destination IP address and protocol type. If the hash matches the offloaded connection parameters (i.e., a hash bucket chain is walked and exact matching of all the tuples of the connection occurs), the chimney 808 is used. If the hash does not match the hash index, the non-offloaded path through network stack 502 is used. Control messages which update cached states are handled by the host. This results in the NIC 53 not having to handle any control messages outside of the offloaded connection such as ICMP, DNS, and RIP messages.

Figure 10:
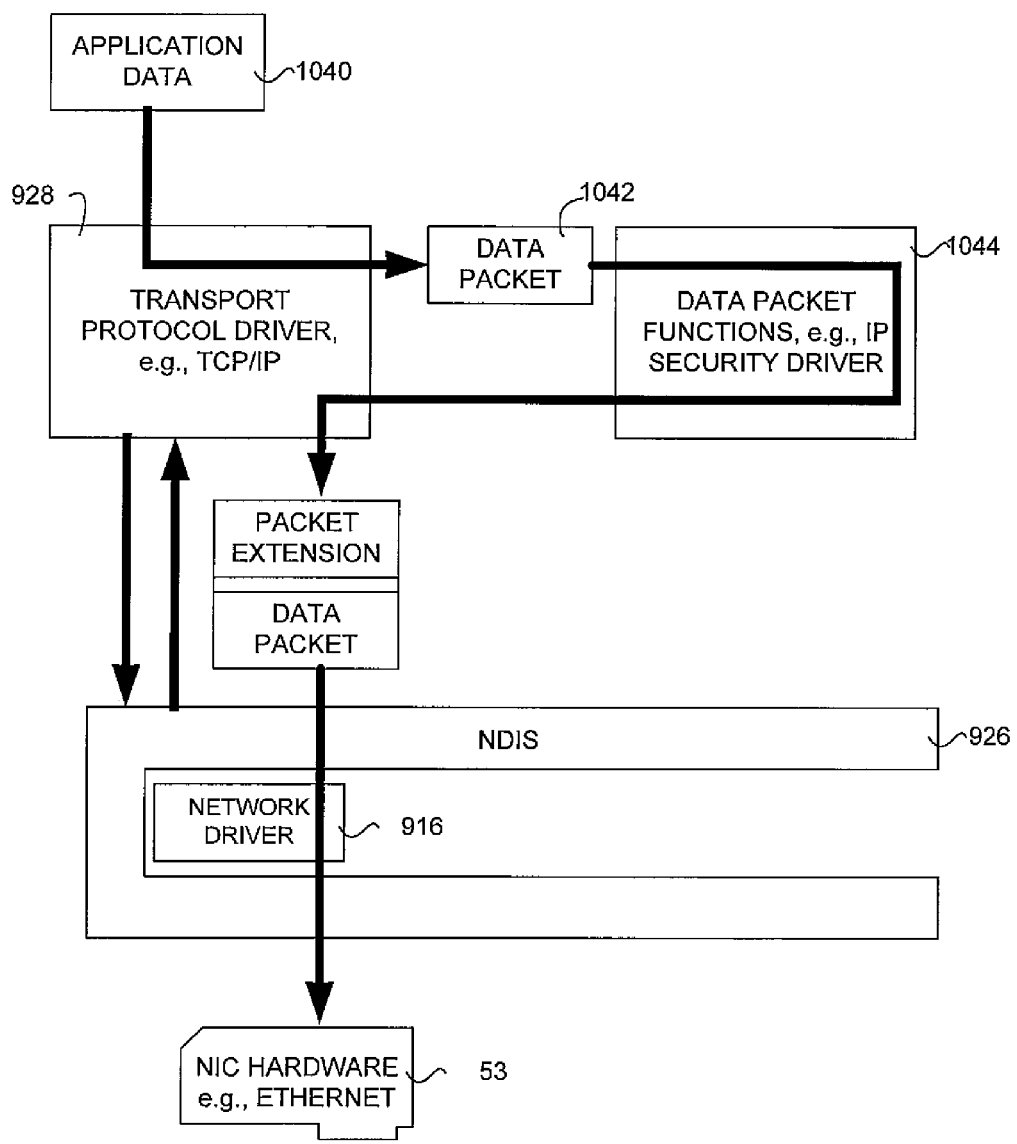
FIG. 10 illustrates a functional block diagram describing the flow of a data packet through program components in accordance with the present disclosure.

As previously noted, the basic unit of data transmission in a Windows or similar layered networking model is the data packet. In the Windows environment, the data packet is referred to as the NDIS packet. Each packet travels from the top of the stack (i.e., layer 5 in the ISO stack) to the lowest software layer (i.e., layer 2 in the ISO stack). Thus, the packet defines a data structure that is common through each level as it proceeds through the layers during transmission and reception of data. By way of example, FIG. 10 illustrates the path followed by the packet as it proceeds down through the respective layers to the NIC, shown at 900 as an Ethernet NIC. As noted above, the transport driver 928 receives data from a sending application and packages it in packet form consistent with the underlying protocol, and then forwards the packet to the lower level device driver 916 via the NDIS interface 926. In addition, the transport protocol may perform other functions on the packet (e.g., checksum calculation, etc.). Alternatively, other functional components may reside in the network layer or data link layers that perform additional functions on the packet, such as the IP Security function 1044 (e.g., encryption and/or message digest calculation) illustrated in FIG. 10.

In one embodiment, the data packet 1042 is the means by which computing tasks are offloaded to the peripheral device, such as the NIC hardware 900. For instance, in FIG. 10 the application data 1040 is passed down from the upper layers of the network model to an appropriate transport protocol driver, such as TCP/IP 928. The driver repackages the data into an appropriate data packet 1042. Then, depending on whatever additional functions are to be performed on this particular data packet 1042 a functional component is included that appends a predefined data structure, referred to as the packet extension, to the data packet. As will be discussed in further detail below, the contents of the packet extension indicate which task, or tasks, are to be performed on the data packet when it reaches the NIC 53. When the data packet 1042 reaches the network driver 916, the contents of this packet extension are queried by the driver 916 so as to ascertain which task(s) is to be performed by the NIC 53. The driver 916 then controls/manipulates the hardware on the NIC so that it will perform whatever functional tasks have been requested via the contents of the packet extension.

For example, in FIG. 10, the data packet 1042 is passed to a software component 1044, which could be implemented separately or implemented as a part of the transport protocol driver itself, that appends a packet extension to the packet 1042. Data will be included within in packet extension depending on the particular task that is to be offloaded. For instance, if an IP security function is to be implemented, data that indicates that the NIC 53 should encrypt the data packet in accordance with a specified encryption key would be included. Of course, the software component 1044 could append predefined data such that any one of a number of functions, such as those discussed above, would be performed at the hardware level instead of by software components that reside in the network layers. The device driver 916 will extract the information from the packet extension, and then invoke the specified task(s) at the NIC 53.

Figure 11:
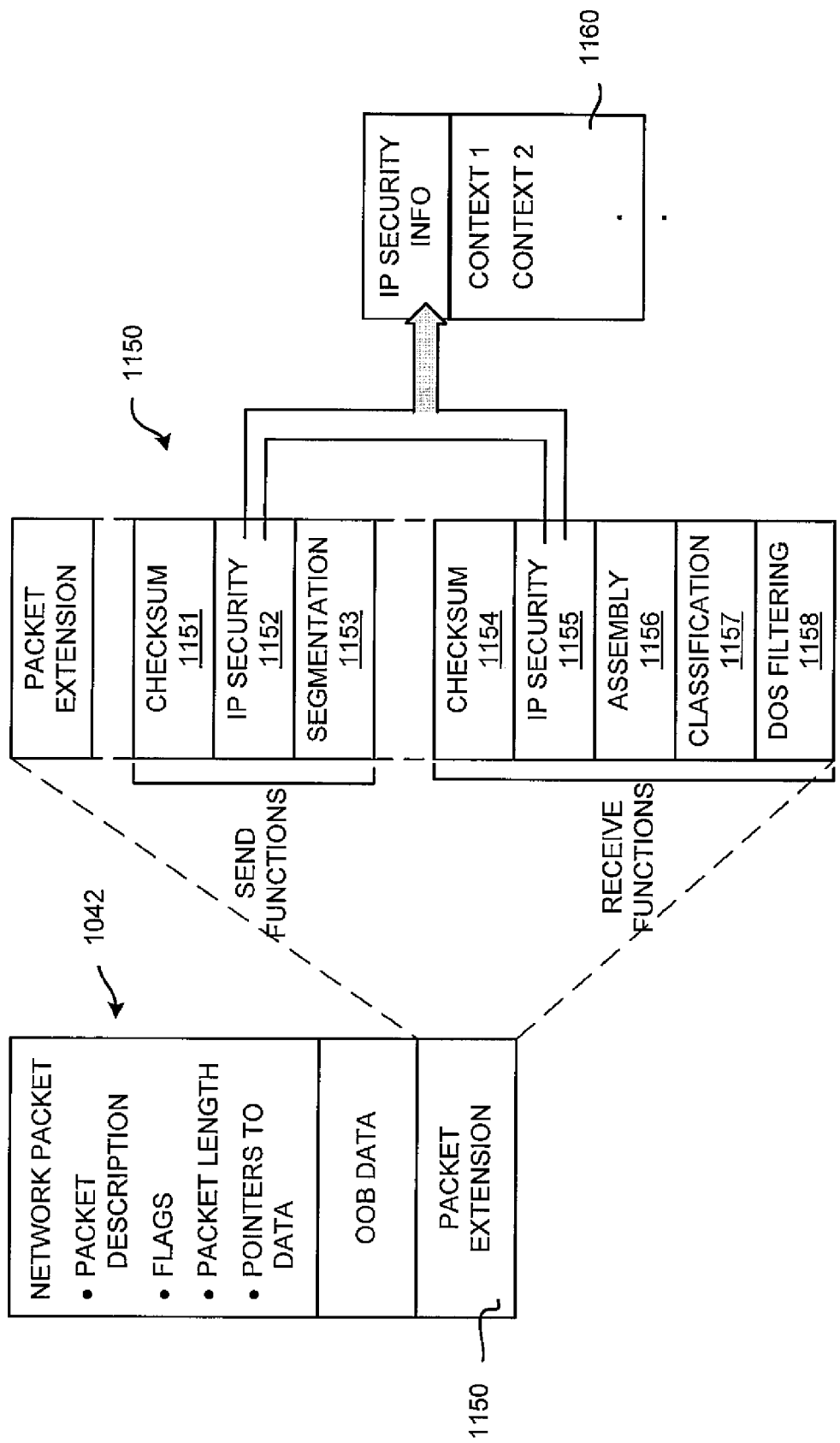
FIG. 11 illustrates embodiment of the data packet and the packet extension.

FIG. 11 illustrates one embodiment of the general structure of the data packet 1042. While the packet 1042 can be of any format depending on the exact network environment being used, in a Windows environment the packet is formatted according to NDIS, and includes information such as a packet descriptor; flags whose meaning is defined by a cooperating device driver(s) and protocol driver(s); areas for storage of Out-of-band data (OOB) associated with the packet; information relating to the length of the packet; and pointers to memory locations relating to the data content of the packet.

FIG. 11 further illustrates the additional data structure field that is appended to the NDIS data packet to identify task offloads—the packet extension 1150. As discussed, it is this packet extension 1150 which defines a data structure containing information necessary for the identification of the particular task, or tasks, that are being offloaded to the destination NIC. In the preferred embodiment, for each task offload type (e.g., checksum, encryption/decryption, etc.) a predefined data field will be included within the packet extension 1150. This data field can simply be in the form of a control flag or flags, which merely indicates that a particular function be performed (such as a checksum), or the information can be in the form of a pointer to a data structure that further defines how a task should be carried out.

The NIC 53 may be configured to recognize the task offload control field in the packet extension 1150 as applying only to the attached packet. Thus, for example, if a particular packet contains a flag signifying the NIC 53 is to perform a checksum operation, the NIC 53 will perform a checksum operation on the attached packet only. However, if there is no such flag for a given packet, then the NIC 53 does not perform the checksum operation for that packet. Alternatively, the task offload control field in the packet extension 1150 may indicate that until the NIC 53 is instructed otherwise, the NIC is to perform the offloaded task on this and all subsequent packets sent out over the network.

The packet extension 1150 may also instruct the NIC station at the receive station of what tasks to perform. For example, the packet extension may instruct the receive station NIC that it is to perform certain functions appropriate when receiving a packet from a network such as, for example, decryption, checksum operations, packet classification, packet filtering to guard against denial of service attacks, packet reassembly, and any other receive function that an NIC may be configured to perform. Of course, the sending station may have no idea on the task offload capabilities of the receive station NIC. If the receive station NIC is unable to perform the requested function, then receive station CPU will accomplish the function instead. Thus, the sending station may have some control over what the NIC at the receiving station does to a particular packet.

In addition, the sending station may also use packet extensions to control the NIC 53 when it functions to receive packets. For example, a particular packet to be sent out over the network may include a packet extension that includes an instruction to the NIC 53 that when it receives packets, it is to perform decryption of the packet. In this case, the instruction does not apply to the packet to be sent out over the network since the instruction is for performing functions to packets received from the network. Therefore, in this case, the packet extension for a packet to be sent over the network serves as a mechanism to control what receive functions are offloaded to the NIC 53 when receiving packets. The sending station has an opportunity to control the NIC 53 receive functions whenever it sends a packet, on a packet-by-packet basis.

Referring again to the example shown in FIG. 11, the packet extension 1150 contains a number of data fields 1151 to 1153 that control the sending functions offloaded to an NIC (e.g., NIC 53) and number of data fields 1154 to 1158 that control the receiving functions offloaded to an NIC (e.g., NIC 53 or an NIC of a receiving station).

For example, the packet extension 1150 includes a data field 1151 signifying that the NIC 53 perform a checksum operation. This indicates to the sending NIC 53 that the sending NIC 53 itself is to perform a checksum operation on the appended packet.

The packet extension 1150 also may include a security function data field 1152, to indicate that the NIC 53 should perform security features such as would be performed in connection with an SSL or IPSec encryption of packet data and/or the calculation of a message digest. For this type of security task, field 1152 preferably contains a pointer to a memory location containing a data structure (e.g., data structure 1160), which in turn contains information relevant to the performance of the encryption and/or message digest functions. Under some circumstances, the inclusion of a pointer to a memory location having pertinent data has advantages over storing actual data within the packet extension itself.

Referring to FIG. 11, a checksum data field 1154 indicates that for all received packets for which checksum calculation has been performed at the send station, the NIC 53 is to perform a checksum calculation to make sure that the data has not been altered en route to the NIC 53. This checksum field 1154 may control the checksum receive function for all packets indefinitely or for a given time period unless expressly contravened by a subsequent checksum field.

The packet extension may also include a security flag 1155 which indicates that the NIC 53 should perform security features as packets are received such as would be performed in connection with an SSL or IPSec decryption of packet data and/or the calculation of a message digest. For this type of security task, field 1155 preferably contains a pointer to a memory location containing a data structure (e.g., data structure 1160), which in turn contains information relevant to the performance of the encryption and/or message digest functions.

The packet extension may also include an assembly data field 1156 which instructs the NIC 53 to assemble the received packets into bulk data, a classification field 1157 which instructs the NIC 53 to classify each packet for quality of service as described above, and a Denial of Service (DOS) attack filter field 1158 for filtering incoming packets for characteristics of a DOS attack as described above. The packet extension 1150 may also include receive function data fields similar to flags 1154-1158 intended for the receiving station NIC to perform on the attacked packet.

In an embodiment, the information contained within the packet extension 1150 is queried by the particular device driver to which the packet 1142 is sent. In the Windows environment described in the illustrated embodiments, this type of function would preferably be performed by making appropriate NDIS function calls. For instance, a call to a predefined NDIS function that returns a pointer to the packet extension 1150 memory location for the packet could be performed. The device driver software could then identify which tasks are to be performed and, depending on the task(s) offloaded, operate/manipulate the driver's corresponding NIC hardware in the appropriate manner.

Utilizing the actual data packet to offload computing tasks from the computer processor to the hardware peripheral is advantageous for a number of reasons. For example, the transport driver can utilize the capabilities of the peripheral on a packet-by-packet basis. This allows tasks to be downloaded dynamically, and the capabilities of a peripheral can be used on an as-needed basis. Thus, if the processing overhead for the computer system is low at a particular point in time, it may be desirable to perform certain tasks on the computer processor in a conventional fashion. Alternatively, if CPU is heavily loaded with other computing tasks, then it can offload tasks to peripheral devices by merely appending the requisite packet extension to the data packets.

Another advantage is the ability offload multiple tasks by way of a single packet, and essentially "batch" a number of operations at once. For instance, when the computer processor performs a checksum operation, or an encryption operation, the entire data field must be loaded into a memory location before the operation can be completed, i.e., the calculation of the checksum or the encryption of the packet data. Moreover, because of the layered networking model only one operation can be performed at a time, thereby requiring the data to be copied into memory multiple times. However, the per-packet approach allows multiple tasks to be offloaded in one packet. Thus, the hardware peripheral can perform two or more operations in a single pass on the data, depending on the capabilities of the hardware, and thereby greatly increase the throughput and efficiency of the computer system.

It will be appreciated that while the above scheme is particularly useful in connection with the ability to specify tasks to be offloaded to a particular NIC, the per-packet transfer of information could be used in other ways as well. For instance, if a particular NIC is capable of scheduling the delivery of packets at predetermined times, the packet extension data structure could be used to pass information identifying how and/or when the packet should be sent by the NIC hardware.

In an embodiment, before a transport protocol driver will append a packet extension to a data packet so as to offload a particular task to a NIC, two additional functions are initially performed. Insofar as there are many different types of hardware peripherals, each having varying processing capabilities, embodiments of the present disclosure preferably provide a means by which the transport driver can first query the task offload capabilities of the peripherals that are connected to the computer system. Once these capabilities have been ascertained, the transport protocol driver can then set, or enable, those tasks that are of interest. Once enabled, the specified tasks can be subsequently utilized on a per-packet basis in the manner described above.

Hardware Acceleration for Remote Access Protocols

As mentioned, remote access and terminal services typically involve desktop virtualization using protocols such as the Remote Desktop Protocol (RDP). Those skilled in the art will appreciate that while the present disclosure is described in terms of the RDP protocol, the disclosed principles may readily be applied to any system that provides remote access services, such as Virtual Network Computing (VNC), Citrix XenApp, and the like.

Protocols such as RDP are designed to facilitate user interaction with a remote computer system by transferring graphics display information from the remote computer to the user and transporting input from the user to the remote computer, where it may be injected locally. This protocol also provides an extensible transport mechanism which allows specialized communication to take place between components on the user computer and components running on the remote computer. Such protocols present virtual desktops and typically handle graphics and process device traffic such as USB, printer, and keyboard and mouse. A terminal server typically hosts multiple remote client sessions. Graphics data from the terminal server needs to be either encoded and encrypted in a graphics primitive form or rendered on the server and the resulting bitmap needs to be compressed and encrypted and transmitted to the client.

Encoding, rendering and encryption operations are highly computational in nature and typically require high CPU utilization. In order to provide a rich desktop virtualization experience the corresponding graphics fidelity should be rich. Beyond code optimization, the host CPU cycles and network utilization associated with rendering and encryption may be reduced by leveraging additional hardware resources which can carry out the rendering and/or compression tasks when needed during RDP processing. Additionally, host CPU processing may be reduced by offloading CPU intensive remote desktop operations to a network processor or other peripheral device before the data is transmitted. As described above, the task offloading, also referred to as chimney offload, may be used to offload TCP/IP processing such as checksum, large send segmentation, IPSEC and TCB state processing to intelligent network interfaces. It would thus be advantageous to utilize the chimney offloading principles described above to handle some or all of the tasks associated with providing remote access services using protocols such as RDP.

Figure 12:
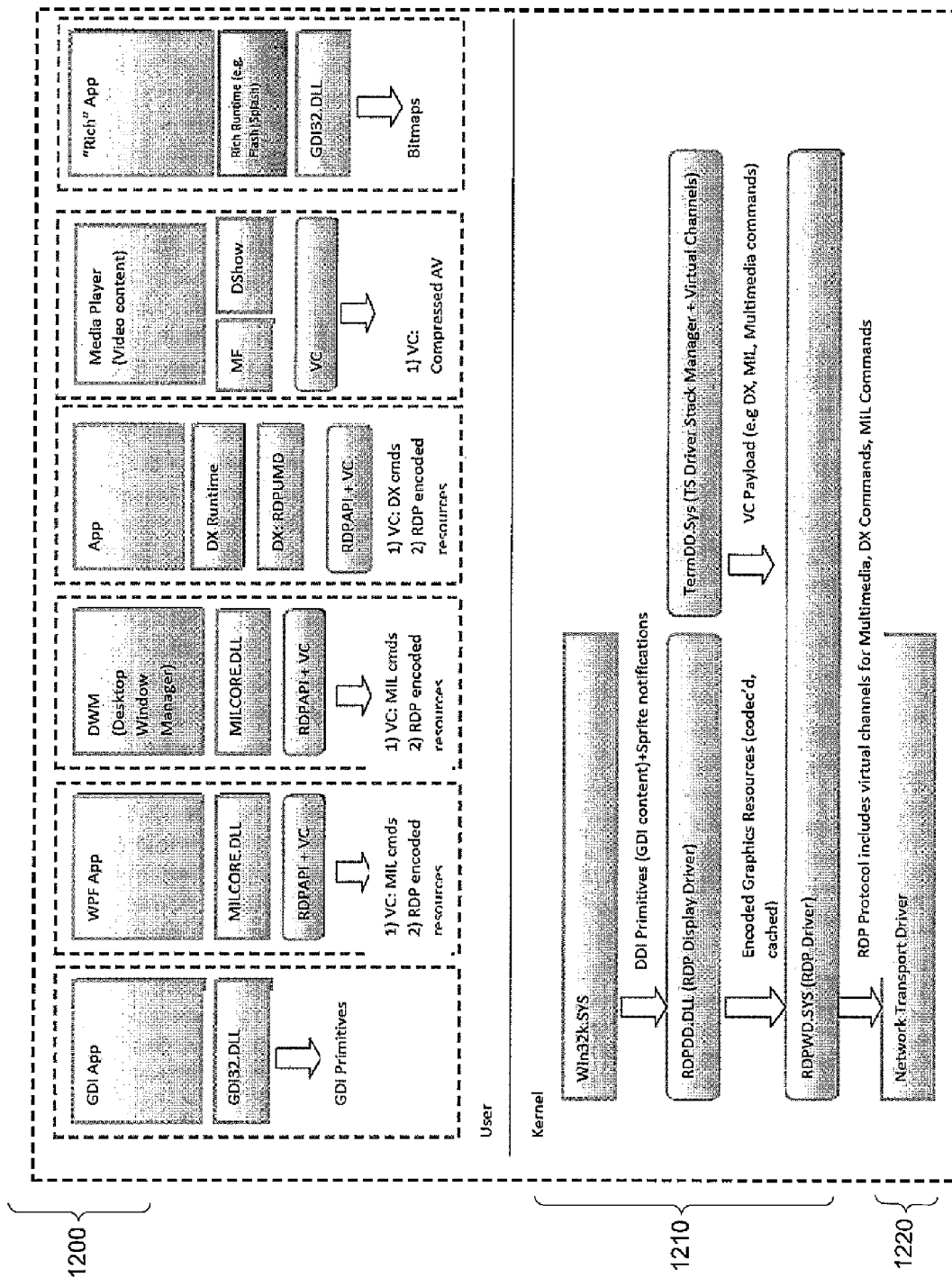
FIG. 12 illustrates an example architecture describing remote terminal services processing.

FIG. 12 depicts an exemplary architecture for providing remote desktop virtualization. Remote desktop processes are typically stacked on top of the transport provider, typically TCP, utilizing the transport layer interface (TLI) to send and receive remote desktop data packets. For example, one or more applications 1200 may call graphics and media APIs that in turn generate graphics output to be further processed by a remote access processing stack 1210. Network transfer driver 1220 may then handle the transmission of the data packets.

Figure 13:
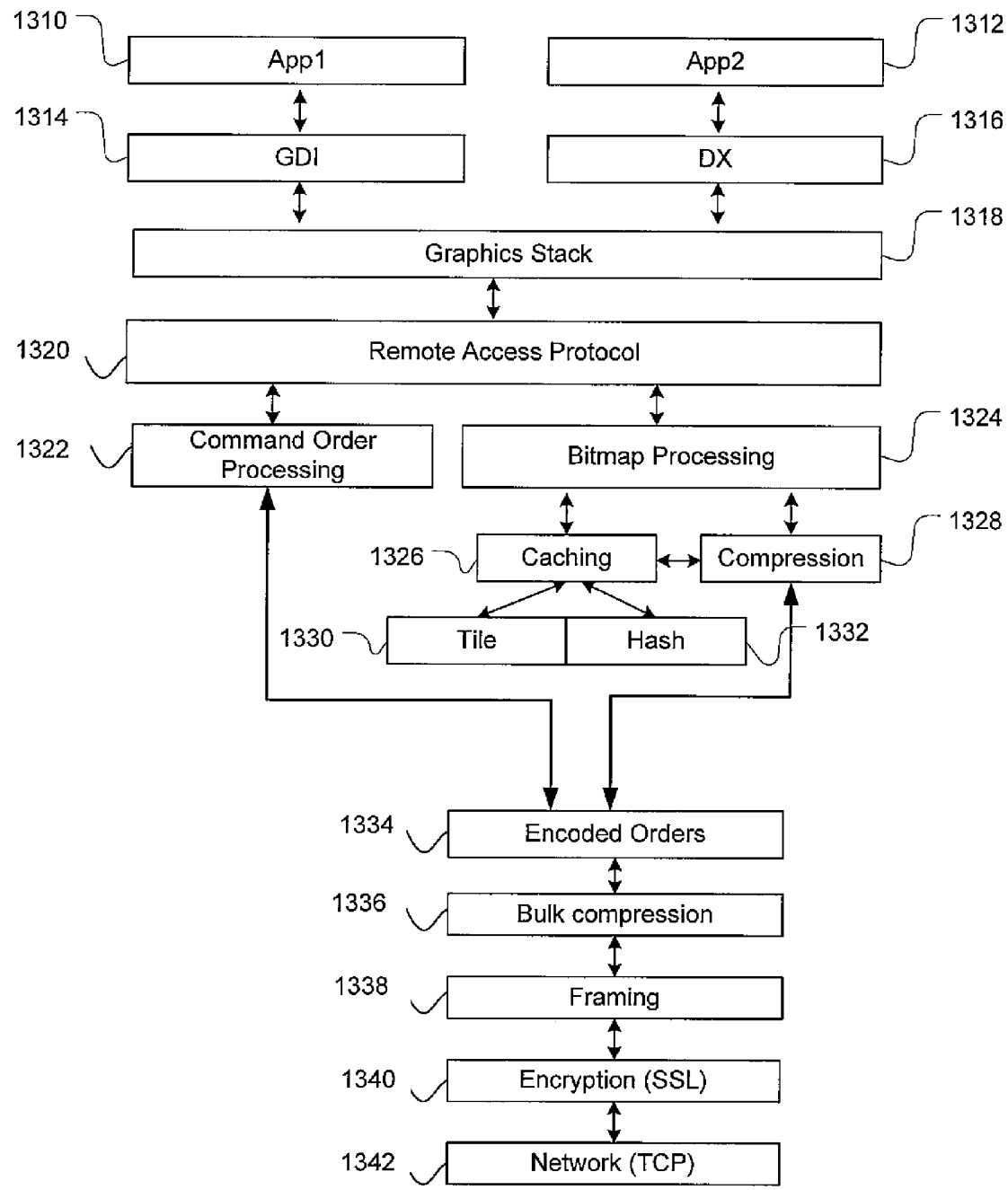
FIG. 13 is a functional block diagram illustrating aspects of remote terminal services processing.

FIG. 13 provides a further exemplary illustration of remote desktop processing functionality. One or more applications may be executing on a server and generating graphics for display at a client display. For example application 1 1310 and application 2 1312 may generate graphics handled by graphics stack 1318. The graphics stack 1318 may comprise various graphics components that are responsible for representing graphical objects and transmitting them to output devices. Examples of such components include Graphics Device Interface (GDI) 1314 and DirectX (DX) 1316.

The graphics output of such applications are intercepted by remote access protocol stack 1320 and further processed as command orders 1322 and bitmaps 1324. Command orders, or drawing orders, are used to encode the operations necessary to produce a graphic image or to manipulate a particular cache. Primary drawing orders are generally used to encode drawing operations. Each primary order may be organized into a set of fields to which field-compression algorithms are applied. These algorithms may be designed to eliminate sending a field if it has not changed since the last time the order was sent and to reduce the size of the field encoding for certain field types when they can be represented by smaller sized data. Examples of primary orders include drawing graphic objects such as rectangles and lines, and displaying text fragments. Secondary drawing orders may be used to manage caches.

Bitmap processing 1324 further comprises caching 1326 and compression 1328. The caching process may further comprise a tiling function 1330 and hash computing function 1332. Remote access protocols may use caches to store drawing primitives such as bitmaps, color tables, and characters. The use of caching techniques may reduce data traffic by ensuring that items used in multiple drawing operations are sent only once from the server to the client.

The outputs of the bitmap processing 1324 and command order processing 1322 may be combined as encoded orders 1334. Remote access protocols may use bulk compression 1336 to compress the data.

Besides employing bulk compression for data, remote access protocols may also use variations of run length encoding (RLE) rules to implement compression of bitmap data sent from server to client. At this point the data may be transmitted by framing the data 1338, encrypting the data 1340, and transporting over the network 1342.

As discussed above, functions such as TCP may be offloaded to a peripheral device employing the above described chimney offloading techniques. As described above, the remoting of graphics images associated with protocols such as RDP is accomplished by continuously sending updated bitmap images from the server to the client which is a computational intensive task. Therefore, the present disclosure extends the chimney offload concepts to encompass the aforementioned remote access processing tasks. In various embodiments, one or more of the processing tasks associated with remote desktop virtualization may be offloaded to the chimney. In some embodiments, a subset of the remote access processing tasks may be offloaded. For example, in some embodiments one or more of bitmap compression 1328, caching 1326 and bulk compression 1336 may be offloaded to a peripheral device such as a NIC to be processed using the disclosed offloading principles. In other embodiments, most or all of the remote access processing, for example the tasks described in FIG. 13, may be offloaded to a peripheral device, with the host processor retaining only control and management functions.

Figure 14:
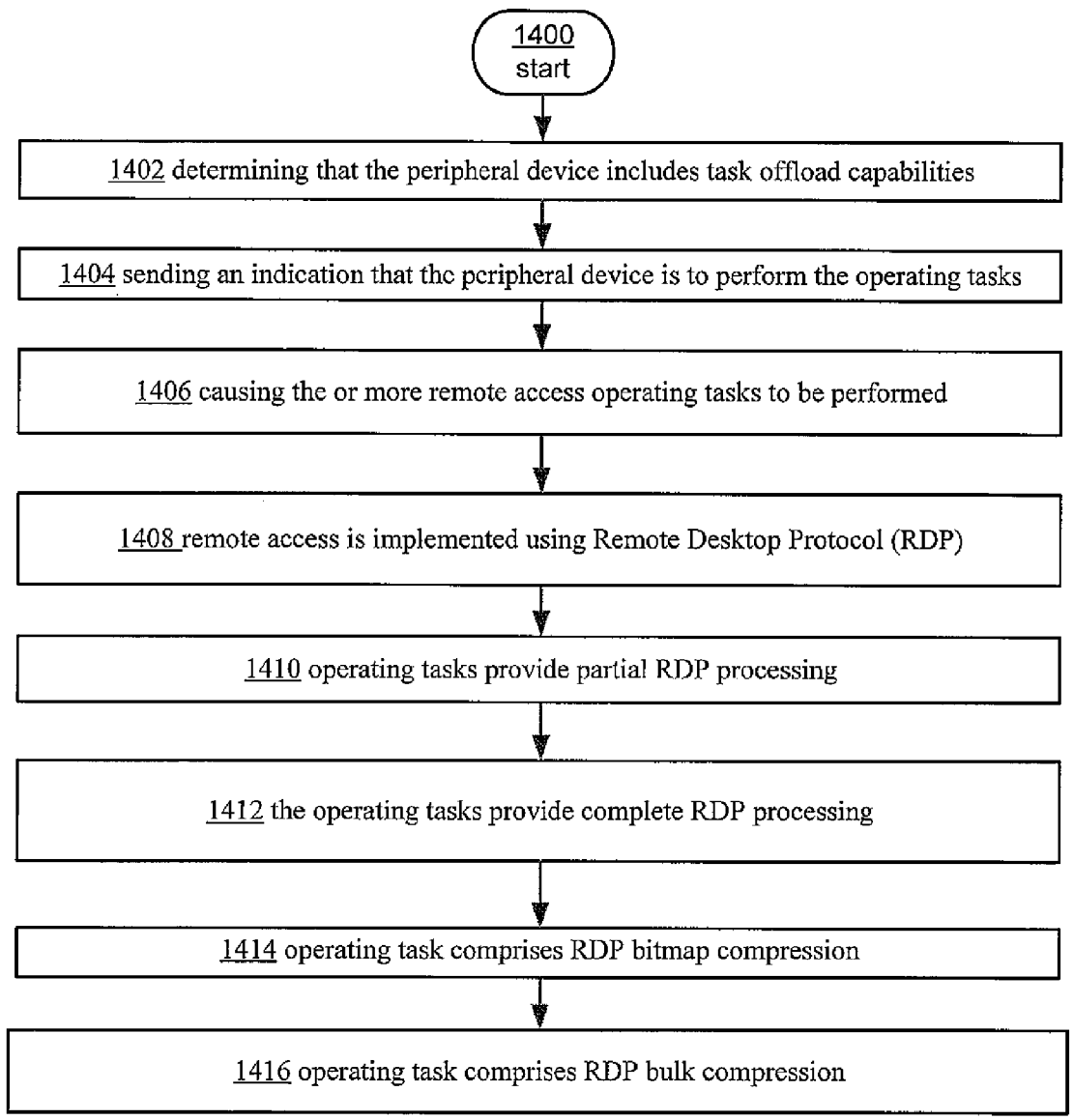
FIG. 14 illustrates an example operational procedure for practicing aspects of the present disclosure.
Figure 15:
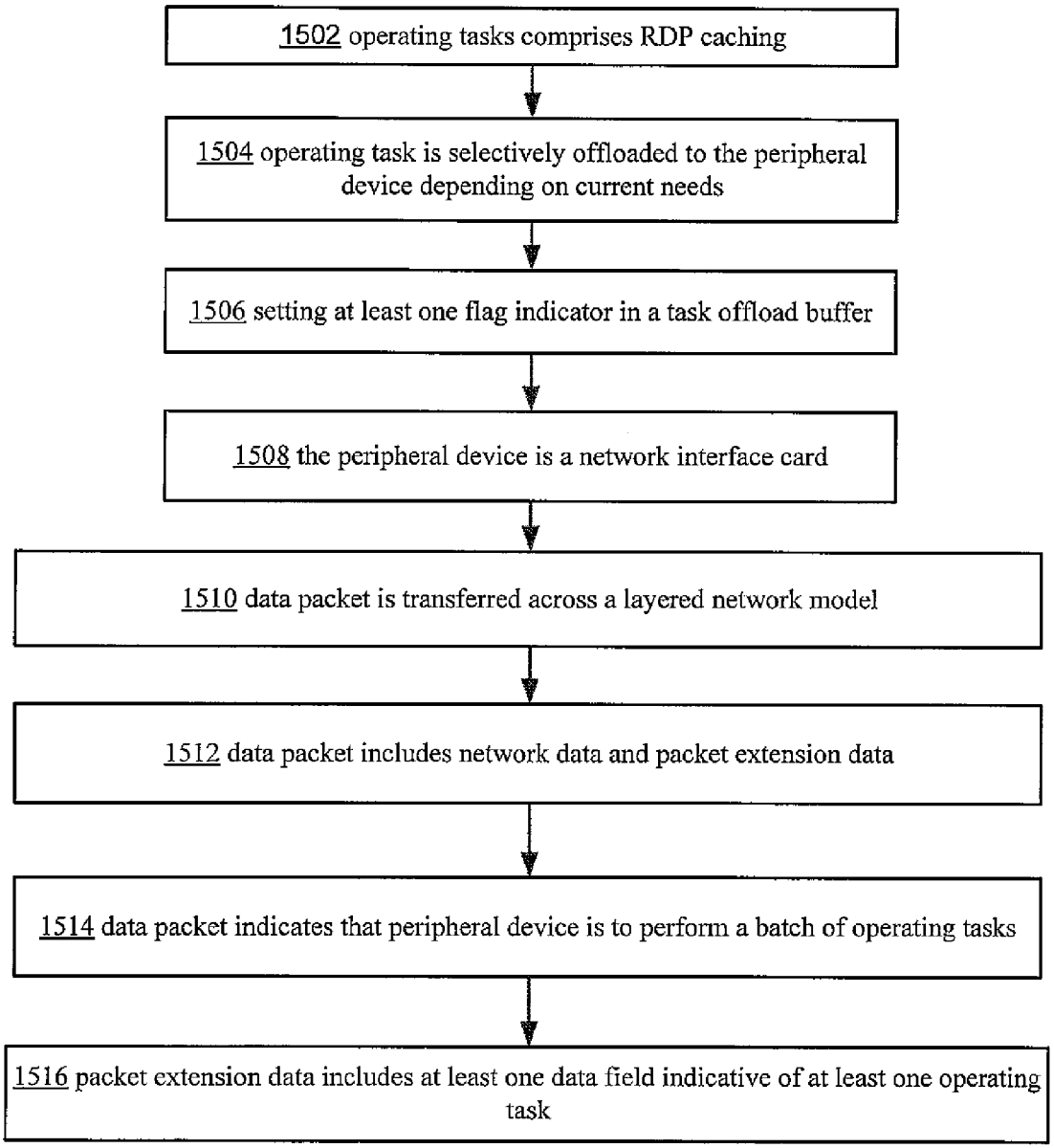
FIG. 15 illustrates an example operational procedure for practicing aspects of the present disclosure.

FIGS. 14 and 15 depict an exemplary operational procedure for providing remote access to a terminal server or virtual machine wherein a transport layer interface is used to send and receive remote access data units including operations 1400, 1402, 1404, 1406, 1408, 1410, 1412, 1414, and 1416. Referring to FIG. 14, operation 1400 begins the operational procedure and operation 1402 illustrates determining that the peripheral device includes task offload capabilities for implementing one or more specified remote access operating tasks. Operation 1404 illustrates sending to the peripheral device an indication that the peripheral device is to perform the one or more operating tasks, including contextual information to be used with subsequent data units.

Operation 1406 illustrates causing the one or more remote access operating tasks to be performed by the peripheral device.

Operation 1408 illustrates that in one embodiment, the remote access is implemented using Remote Desktop Protocol (RDP). Operation 1410 illustrates that the operating tasks may provide partial RDP processing. Alternatively, operation 1412 illustrates that the operating tasks provide complete RDP processing. Operation 1414 illustrates that an exemplary operating task comprises RDP bitmap compression. Operation 1416 illustrates that an exemplary operating task comprises RDP bulk compression.

Continuing with FIG. 15, operation 1502 illustrates that the operating tasks comprises RDP caching. Operation 1504 illustrates that the operating task is selectively offloaded to the peripheral device depending on current needs of the computer system. Operation 1504 illustrates enabling the task offload capabilities by setting at least one flag indicator in a task offload buffer. In an embodiment, each peripheral device driver (see, e.g., FIG. 9) may have associated with it a predefined task offload buffer location(s) that each contains the task offload capabilities for that device driver and its corresponding peripheral. The task offload buffer may identify the particular task(s) supported by the peripheral and its device driver, and will also include any information specific to each individual task supported. In one embodiment, the contents of a device driver's task offload buffer may be retrieved by way of an NDIS function call. Operation 1508 illustrates that in one embodiment the peripheral device is a network interface card (NIC).

Operation 1510 illustrates that the data packet may be transferred across a layered network model. Operation 1512 illustrates that the data packet may include network data and packet extension data. Operation 1514 illustrates that the data packet indicates that the peripheral device is to perform a batch of operating tasks. Operation 1516 illustrates that the packet extension data includes at least one data field indicative of at least one operating task to be performed by the peripheral device.

Figure 16:
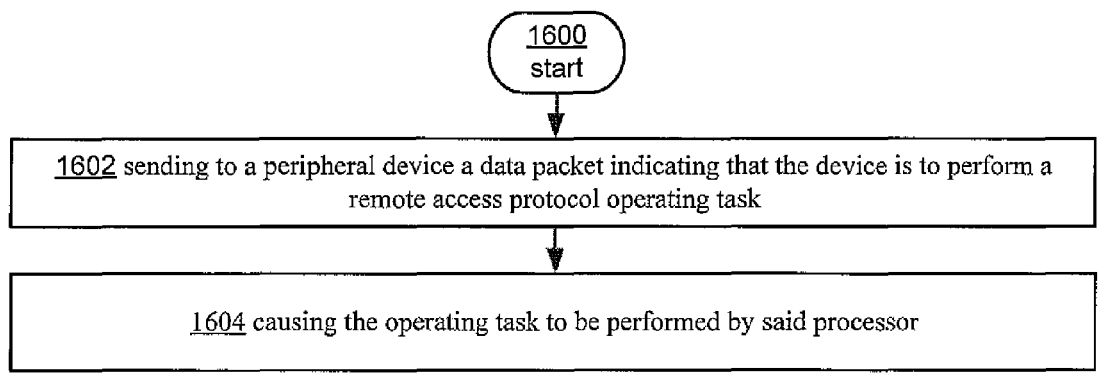
FIG. 16 illustrates an example operational procedure for practicing aspects of the present disclosure.

FIG. 16 depict an exemplary operational procedure for offloading remote access processing tasks to a peripheral device including operations 1600, 1602, and 1604. Referring to FIG. 16, operation 1600 begins the operational procedure and operation 1602 illustrates sending to a peripheral device a data packet indicating that the device is to perform a remote access protocol operating task. Operation 1604 illustrates causing the operating task to be performed by said processor.

Figure 17:
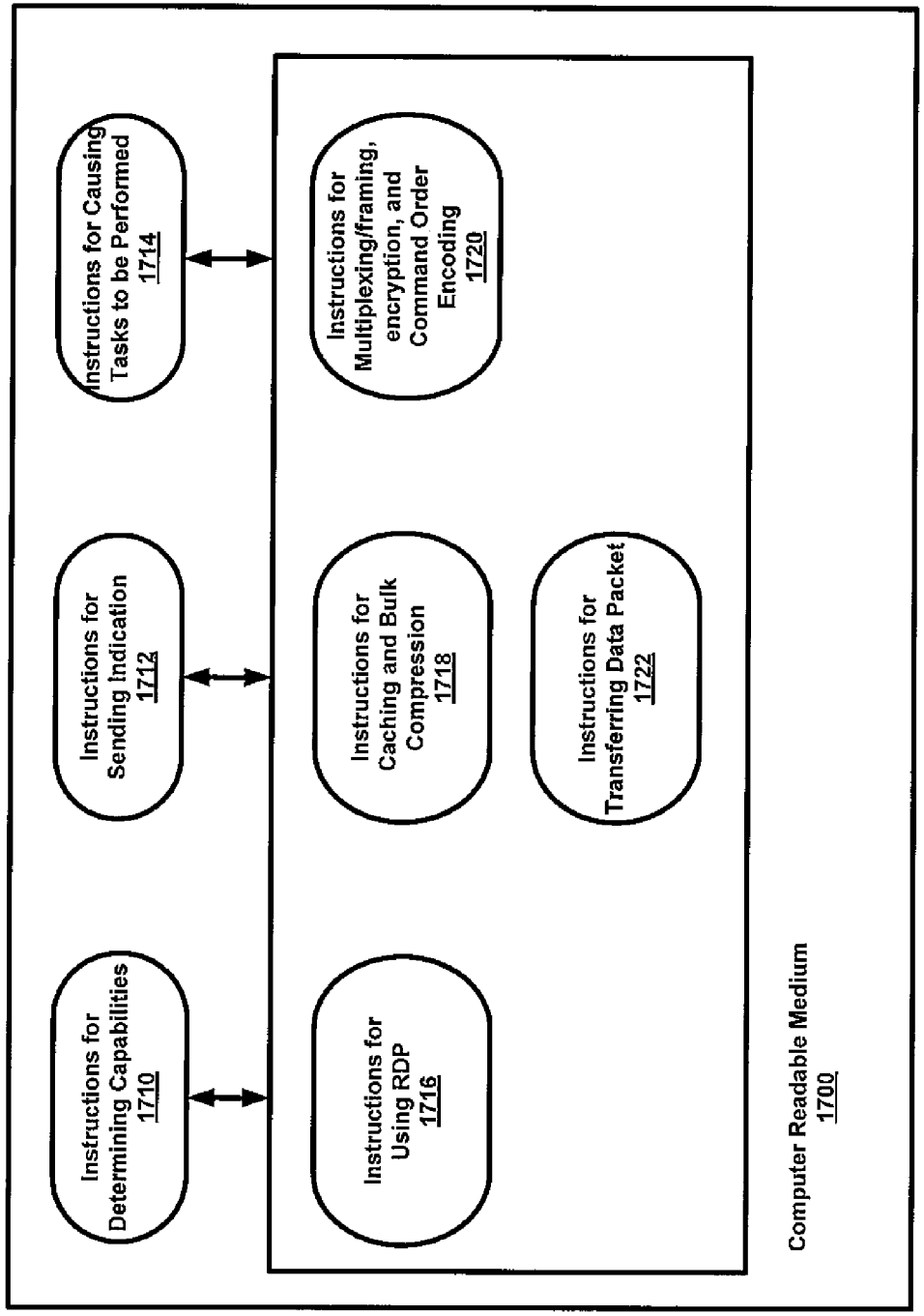
FIG. 17 illustrates a computer readable medium bearing computer executable instructions discussed with respect to FIGS. 1-16, above.

Any of the above mentioned aspects can be implemented in methods, systems, computer readable media, or any type of manufacture. For example, per FIG. 17, a computer readable medium can store thereon computer executable instructions for offloading remote access processing tasks to a peripheral device. Such media can comprise a first subset of instructions for determining that the peripheral device includes task offload capabilities 1710; a second subset of instructions for sending to the peripheral device an indication that the peripheral device is to perform one of said operating tasks 1712; and a third subset of instructions for causing the or more remote access operating tasks to be performed by the peripheral device 1714. It will be appreciated by those skilled in the art that additional sets of instructions can be used to capture the various other aspects disclosed herein, and that the three presently disclosed subsets of instructions can vary in detail per the present disclosure.

For example, the instructions can further comprise instructions 1716 for implemented said remote access using Remote Desktop Protocol (RDP). The instructions can further comprise instructions for caching and bulk compression 1718, instructions for multiplexing/framing, encryption, and command order encoding 1720, and instructions for transferring the data packet across a layered network model 1722.

As described above, aspects of the presently disclosed subject matter may execute on a programmed computer. FIG. 1 and the following discussion is intended to provide a brief description of a suitable computing environment in which the those aspects may be implemented. One skilled in the art can appreciate that the computer system of FIG. 1 can in some embodiments effectuate the server and the client of FIGS. 2-4. In these example embodiments, the server and client can include some or all of the components described in FIG. 1 and in some embodiments the server and client can each include circuitry configured to instantiate specific aspects of the present disclosure.

The term circuitry used through the disclosure can include specialized hardware components. In the same or other embodiments circuitry can include microprocessors configured to perform function(s) by firmware or switches. In the same or other example embodiments circuitry can include one or more general purpose processing units and/or multi-core processing units, etc., that can be configured when software instructions that embody logic operable to perform function(s) are loaded into memory, e.g., RAM and/or virtual memory. In example embodiments where circuitry includes a combination of hardware and software, an implementer may write source code embodying logic and the source code can be compiled into machine readable code that can be processed by the general purpose processing unit(s).

Figure 1A:
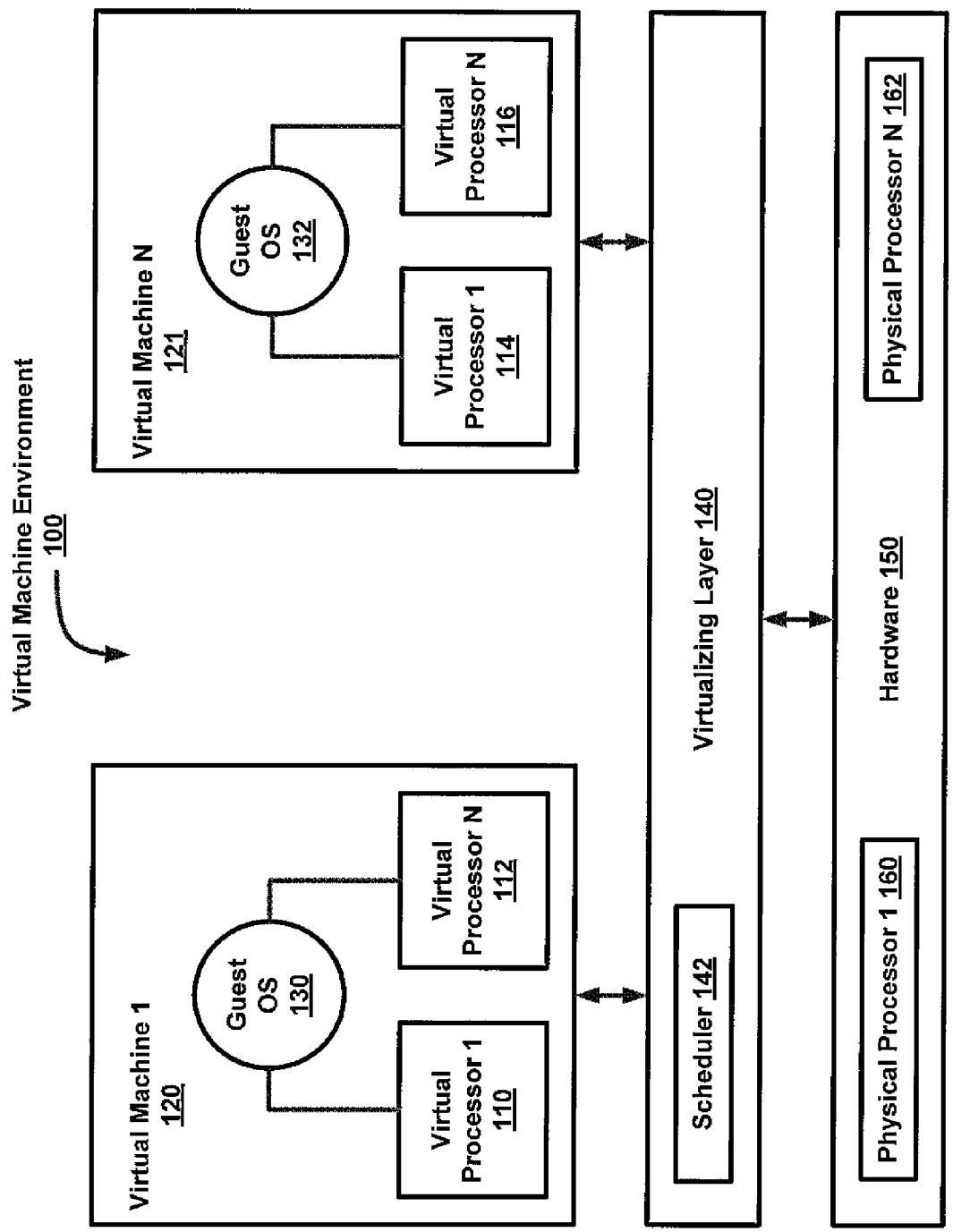
FIG. 1A illustrates a virtual machine environment, with a plurality of virtual machines, comprising a plurality of virtual processors and corresponding guest operating systems; the virtual machines are maintained by a virtualizing layer which may comprise a scheduler and other components, where the virtualizing layer virtualizes hardware for the plurality of virtual machines.

FIG. 1 depicts an example of a computing system which is configured to with aspects of the disclosure. The computing system can include a computer 20 or the like, including a processing unit 21, a system memory 22, and a system bus 23 that couples various system components including the system memory to the processing unit 21. The system bus 23 may be any of several types of bus structures including a memory bus or memory controller, a peripheral bus, and a local bus using any of a variety of bus architectures. The system memory includes read only memory (ROM) 24 and random access memory (RAM) 25. A basic input/output system 26 (BIOS), containing the basic routines that help to transfer information between elements within the computer 20, such as during start up, is stored in ROM 24. The computer 20 may further include a hard disk drive 27 for reading from and writing to a hard disk, not shown, a magnetic disk drive 28 for reading from or writing to a removable magnetic disk 29, and an optical disk drive 30 for reading from or writing to a removable optical disk 31 such as a CD ROM or other optical media. In some example embodiments, computer executable instructions embodying aspects of the disclosure may be stored in ROM 24, hard disk (not shown), RAM 25, removable magnetic disk 29, optical disk 31, and/or a cache of processing unit 21. The hard disk drive 27, magnetic disk drive 28, and optical disk drive 30 are connected to the system bus 23 by a hard disk drive interface 32, a magnetic disk drive interface 33, and an optical drive interface 34, respectively. The drives and their associated computer readable media provide non volatile storage of computer readable instructions, data structures, program modules and other data for the computer 20. Although the environment described herein employs a hard disk, a removable magnetic disk 29 and a removable optical disk 31, it should be appreciated by those skilled in the art that other types of computer readable media which can store data that is accessible by a computer, such as magnetic cassettes, flash memory cards, digital video disks, Bernoulli cartridges, random access memories (RAMs), read only memories (ROMs) and the like may also be used in the operating environment.

A number of program modules may be stored on the hard disk, magnetic disk 29, optical disk 31, ROM 24 or RAM 25, including an operating system 35, one or more application programs 36, other program modules 37 and program data 38. A user may enter commands and information into the computer 20 through input devices such as a keyboard 40 and pointing device 42. Other input devices (not shown) may include a microphone, joystick, game pad, satellite disk, scanner or the like. These and other input devices are often connected to the processing unit 21 through a serial port interface 46 that is coupled to the system bus, but may be connected by other interfaces, such as a parallel port, game port or universal serial bus (USB). A display 47 or other type of display device can also be connected to the system bus 23 via an interface, such as a video adapter 48. In addition to the display 47, computers typically include other peripheral output devices (not shown), such as speakers and printers. The system of FIG. 1 also includes a host adapter 55, Small Computer System Interface (SCSI) bus 56, and an external storage device 62 connected to the SCSI bus 56.

The computer 20 may operate in a networked environment using logical connections to one or more remote computers, such as a remote computer 49. The remote computer 49 may be another computer, a server, a router, a network PC, a peer device or other common network node, a virtual machine, and typically can include many or all of the elements described above relative to the computer 20, although only a memory storage device 50 has been illustrated in FIG. 1. The logical connections depicted in FIG. 1 can include a local area network (LAN) 51 and a wide area network (WAN) 52. Such networking environments are commonplace in offices, enterprise wide computer networks, intranets and the Internet.

When used in a LAN networking environment, the computer 20 can be connected to the LAN 51 through a network interface or adapter 53. When used in a WAN networking environment, the computer 20 can typically include a modem 54 or other means for establishing communications over the wide area network 52, such as the Internet. The modem 54, which may be internal or external, can be connected to the system bus 23 via the serial port interface 46. In a networked environment, program modules depicted relative to the computer 20, or portions thereof, may be stored in the remote memory storage device. It will be appreciated that the network connections shown are examples and other means of establishing a communications link between the computers may be used. Moreover, while it is envisioned that numerous embodiments of the presently disclosed subject matter are particularly well-suited for computer systems, nothing in this document is intended to limit the disclosure to such embodiments.

The foregoing detailed description has set forth various embodiments of the systems and/or processes via examples and/or operational diagrams. Insofar as such block diagrams, and/or examples contain one or more functions and/or operations, it will be understood by those within the art that each function and/or operation within such block diagrams, or examples can be implemented, individually and/or collectively, by a wide range of hardware, software, firmware, or virtually any combination thereof.

While particular aspects and embodiments of the subject matter described herein have been shown and described, it will be apparent to those skilled in the art that, based upon the teachings herein, changes and modifications may be made and, therefore, the appended claims are to encompass within their scope all such changes and modifications as are within the true spirit and scope of the subject matter described herein.

What is claimed:

1. A method for offloading graphics processing tasks from a remote presentation server to a network peripheral device, the method comprising:
   determining that the network peripheral device is configured to receive and perform one or more graphics processing tasks associated with remote presentation graphics that are to be sent from the remote presentation server to a remote computing device over a communication network, wherein the one or more graphics processing tasks are to be offloaded from the remote presentation server to the network peripheral device for execution by the network peripheral device;
   sending to the network peripheral device an indication that the network peripheral device is to perform the one or more graphics processing tasks; and
   causing the one or more remote desktop graphics processing tasks to be performed by the network peripheral device, wherein the graphics processing tasks comprise tasks that would otherwise be performed by the remote presentation server.

2. The method of claim 1, wherein said one or more graphics processing tasks provide partial remote access processing.

3. The method of claim 1, wherein said one or more graphics processing tasks provide complete remote access processing.

4. The method of claim 1, wherein said one or more graphics processing tasks comprises bitmap compression.

5. The method of claim 1, wherein said one or more graphics processing tasks comprises bulk compression.

6. The method of claim 1, wherein said one or more graphics processing tasks comprises caching.

7. The method of claim 1, wherein the one or more graphics processing tasks are selectively offloaded to the peripheral device based at least in part on current needs of at least one of the computer system, a network connection type, and a remote client.

8. The method of claim 1, further comprising enabling the network peripheral device to perform the one or more graphics processing tasks by setting at least one flag indicator in a task offload buffer associated with the network peripheral device.

9. The method of claim 1, wherein the network peripheral device is a network interface card (NIC).

10. The method of claim 1, wherein data sent to the network peripheral device to perform the one or more graphics processing tasks are transferred across a layered network model.

11. The method of claim 10, wherein the data includes network data and packet extension data.

12. The method of claim 10, wherein the data indicates that the network peripheral device is to perform a batch of graphics processing tasks.

13. The method of claim 11, wherein the packet extension data includes at least one data field indicative of at least one graphics processing task to be performed by the network peripheral device.

14. The method of claim 1, wherein said graphics processing is associated with Remote Desktop Protocol (RDP).

15. A system adapted to offload graphics processing tasks to a peripheral device, comprising:
   at least one processor; and
   at least one memory communicatively coupled to said at least one processor, the memory having stored therein computer-executable instructions for:
     determining that the peripheral device is configured to receive and perform one or more graphics processing tasks associated with remote presentation graphics that are to be sent from the remote presentation server to a remote computing device over a communication network, wherein the one or more graphics processing tasks are to be offloaded from the remote presentation server to the peripheral device for execution by the peripheral device;
     sending to the peripheral device an indication that the peripheral device is to perform the one or more graphics processing tasks; and
     causing the one or more remote desktop graphics processing tasks to be performed by the peripheral device, wherein the graphics processing tasks comprise tasks that would otherwise be performed by the remote presentation server.

16. A computer readable storage medium storing thereon computer executable instructions for offloading remote desktop graphics bitmap processing tasks to a peripheral device, the tasks comprising graphics rendering and compression tasks, the medium comprising:
   instructions for determining that the peripheral device is configured to receive and perform one or more graphics processing tasks associated with remote presentation graphics that are to be sent from the remote presentation server to a remote computing device over a communication network, wherein the one or more graphics processing tasks are to be offloaded from the remote presentation server to the peripheral device for execution by the peripheral device;
   instructions for sending to the peripheral device an indication that the peripheral device is to perform the one or more graphics processing tasks; and
   instructions for causing the one or more remote desktop graphics processing tasks to be performed by the peripheral device, wherein the graphics processing tasks comprise tasks that would otherwise be performed by the remote presentation server.

17. The computer readable storage medium of claim 16, wherein said one or more graphics processing tasks comprises graphics bit map processing.

18. The computer readable storage medium of claim 17, wherein said graphics bit map processing comprises caching and bulk compression.

19. The computer readable storage medium of claim 16, wherein said one or more graphics processing tasks comprises one of multiplexing/framing, encryption, and command order encoding.

20. The computer readable storage medium of claim 16, wherein the one or more graphics processing tasks are sent to the peripheral device across a layered network model.

* * * * *